(12) United States Patent
LaCroix et al.

(10) Patent No.: US 8,562,327 B2
(45) Date of Patent: Oct. 22, 2013

(54) FLOATING CUT-OFF BAR AND METHOD OF USE THEREOF

(75) Inventors: David M. LaCroix, St. Paul, MN (US); Robert A. MacDonald, Plymouth, MN (US)

(73) Assignee: Keystone Retaining Wall Systems LLC, West Chester, OH (US)

( * ) Notice: Subject to any disclaimer, the term of this patent is extended or adjusted under 35 U.S.C. 154(b) by 0 days.

(21) Appl. No.: 13/397,940

(22) Filed: Feb. 16, 2012

(65) Prior Publication Data

US 2012/0146263 A1 Jun. 14, 2012

Related U.S. Application Data

(63) Continuation of application No. 12/580,368, filed on Oct. 16, 2009, now abandoned.

(60) Provisional application No. 61/183,611, filed on Jun. 3, 2009.

(51) Int. Cl.
*B28B 13/04* (2006.01)

(52) U.S. Cl.
USPC ............ 425/217; 425/219; 425/258; 425/447

(58) Field of Classification Search
USPC ........... 425/219, 253, 256, 346, 443, 217, 64; 249/112
See application file for complete search history.

(56) References Cited

U.S. PATENT DOCUMENTS

| | | | |
|---|---|---|---|
| 1,268,226 A * | 6/1918 | Flood | 425/219 |
| 1,905,975 A | 4/1933 | Thomas | |
| 2,652,613 A | 9/1953 | Warren | |
| 2,821,005 A | 1/1958 | Davis | |
| 2,839,810 A | 6/1958 | Kovach | |
| 2,948,043 A | 8/1960 | Gory | |
| 3,213,511 A | 10/1965 | Petruzzi | |
| 3,277,551 A | 10/1966 | Hidco | |

(Continued)

FOREIGN PATENT DOCUMENTS

DE    102 17 199 C1    9/2003
EP    0 547 305 A2    6/1993

(Continued)

OTHER PUBLICATIONS

International Search Report and Written Opinion for application PCT/US2009/050259, mailed Nov. 6, 2009 (9 pages).

(Continued)

*Primary Examiner* — Yogendra Gupta
*Assistant Examiner* — Emmanuel S Luk
(74) *Attorney, Agent, or Firm* — Popovich, Wiles & O'Connell, P.A.

(57) ABSTRACT

A floating cut-off bar that follows a preselected path of travel over a mold box during a block production cycle. The floating cut-off bar may be coupled to a feed drawer whereby a mechanism allows the floating cut-off bar to engage the specified contour of a division plate in a mold box assembly and aid in material distribution by screeding excess material and delivering additional material to areas of the mold box as necessary and method of making wall blocks therefrom. The specified contour of the division plate is designed to optimally deliver material to achieve a specified uniform density of the block produced for greater structural integrity, strength and durability of the block.

12 Claims, 19 Drawing Sheets

(56) References Cited

U.S. PATENT DOCUMENTS

| | | | |
|---|---|---|---|
| 3,397,435 | A | 8/1968 | Jelesiewicz |
| 3,655,318 | A | 4/1972 | Schneider et al. |
| 3,833,331 | A | 9/1974 | Springs |
| 3,879,156 | A | 4/1975 | Buhrer et al. |
| 3,885,900 | A | 5/1975 | Kanta |
| 3,942,923 | A | 3/1976 | Binion |
| 4,019,848 | A | 4/1977 | Balhorn |
| 4,035,124 | A | 7/1977 | Balhorn |
| 4,131,670 | A | 12/1978 | Abate |
| 4,260,352 | A | 4/1981 | Balhorn |
| 4,272,230 | A | 6/1981 | Abate |
| 4,936,763 | A | 6/1990 | Thomas |
| 5,503,546 | A | 4/1996 | Aaseth et al. |
| 5,634,344 | A | 6/1997 | Yamauchi |
| 5,934,343 | A | 8/1999 | Gaylo et al. |
| 6,213,754 | B1 | 4/2001 | Doty et al. |
| 6,352,236 | B1 | 3/2002 | Aaseth et al. |
| 6,387,307 | B1 | 5/2002 | Bossetti |
| 6,998,075 | B2 | 2/2006 | Sandqvist |
| 7,470,121 | B2 | 12/2008 | Ness et al. |
| 7,635,261 | B2 | 12/2009 | High et al. |
| 7,687,005 | B2 | 3/2010 | Skidmore et al. |
| 8,002,536 | B2 | 8/2011 | Ness et al. |
| 2001/0052654 | A1 | 12/2001 | Saddler et al. |
| 2003/0006521 | A1 | 1/2003 | Rivola |
| 2003/0160347 | A1 | 8/2003 | Saddler et al. |

FOREIGN PATENT DOCUMENTS

| | | |
|---|---|---|
| EP | 0 659 526 A1 | 6/1995 |
| EP | 0 685 350 A1 | 12/1995 |
| GB | 588 856 A | 6/1947 |
| JP | 53 061618 A | 6/1978 |
| WO | WO 98/23424 A2 | 6/1998 |

OTHER PUBLICATIONS

Abstract for DE 102 17 199 C1 (1 page).
Oct. 14, 2010 International Search Report and Written Opinion for PCT Application No. PCT/US2010/037238 (14 pages).

\* cited by examiner

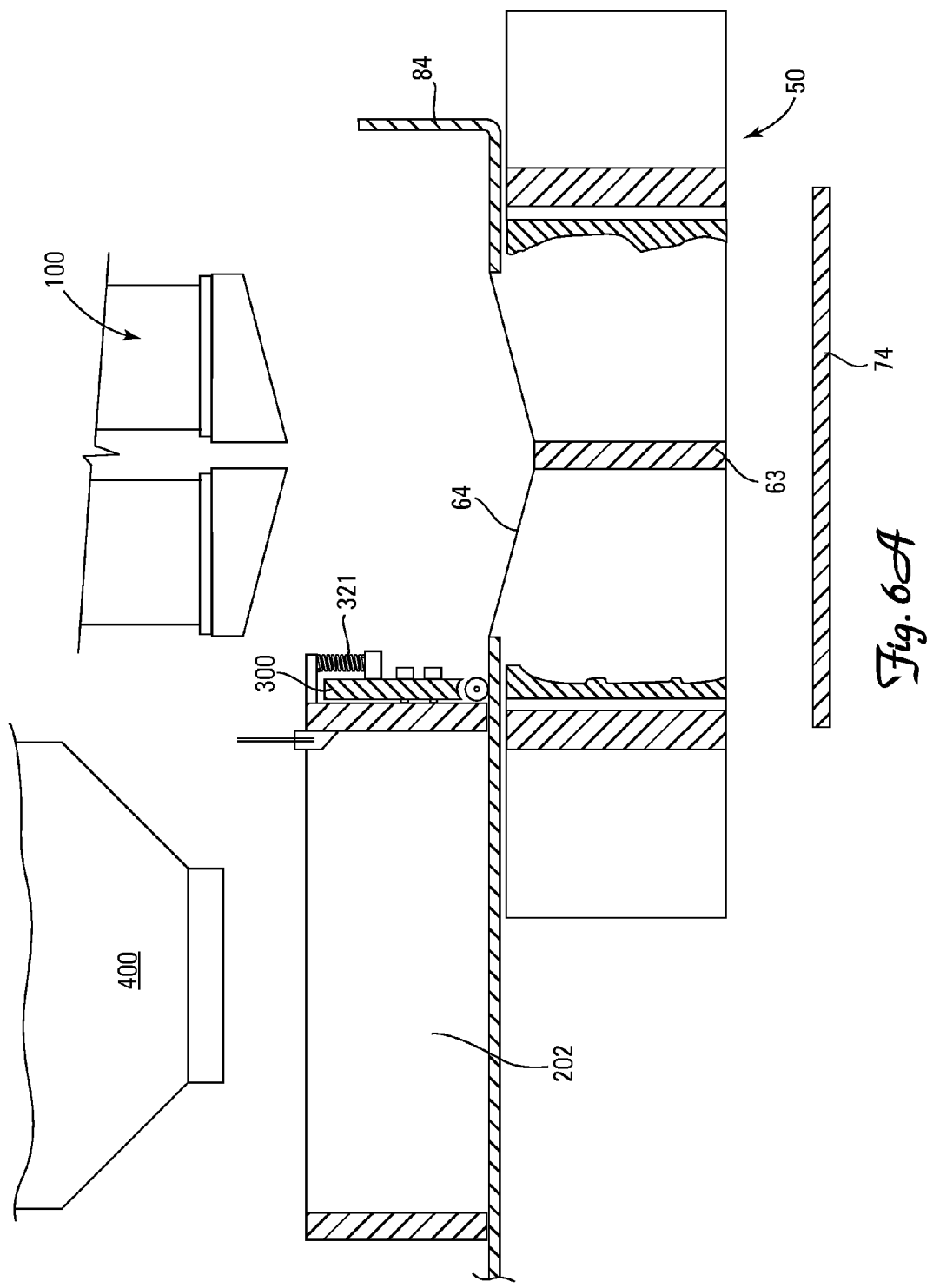

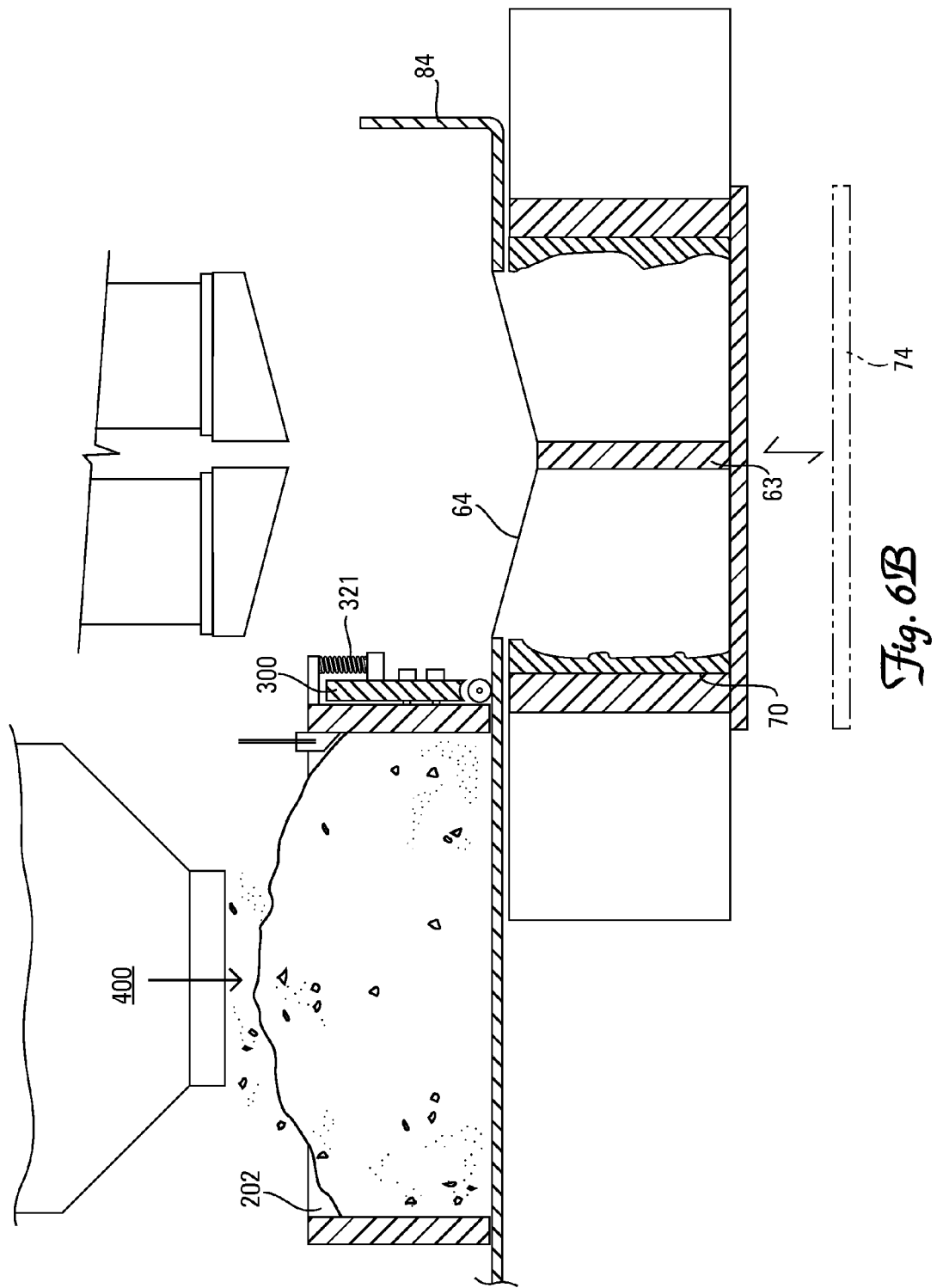

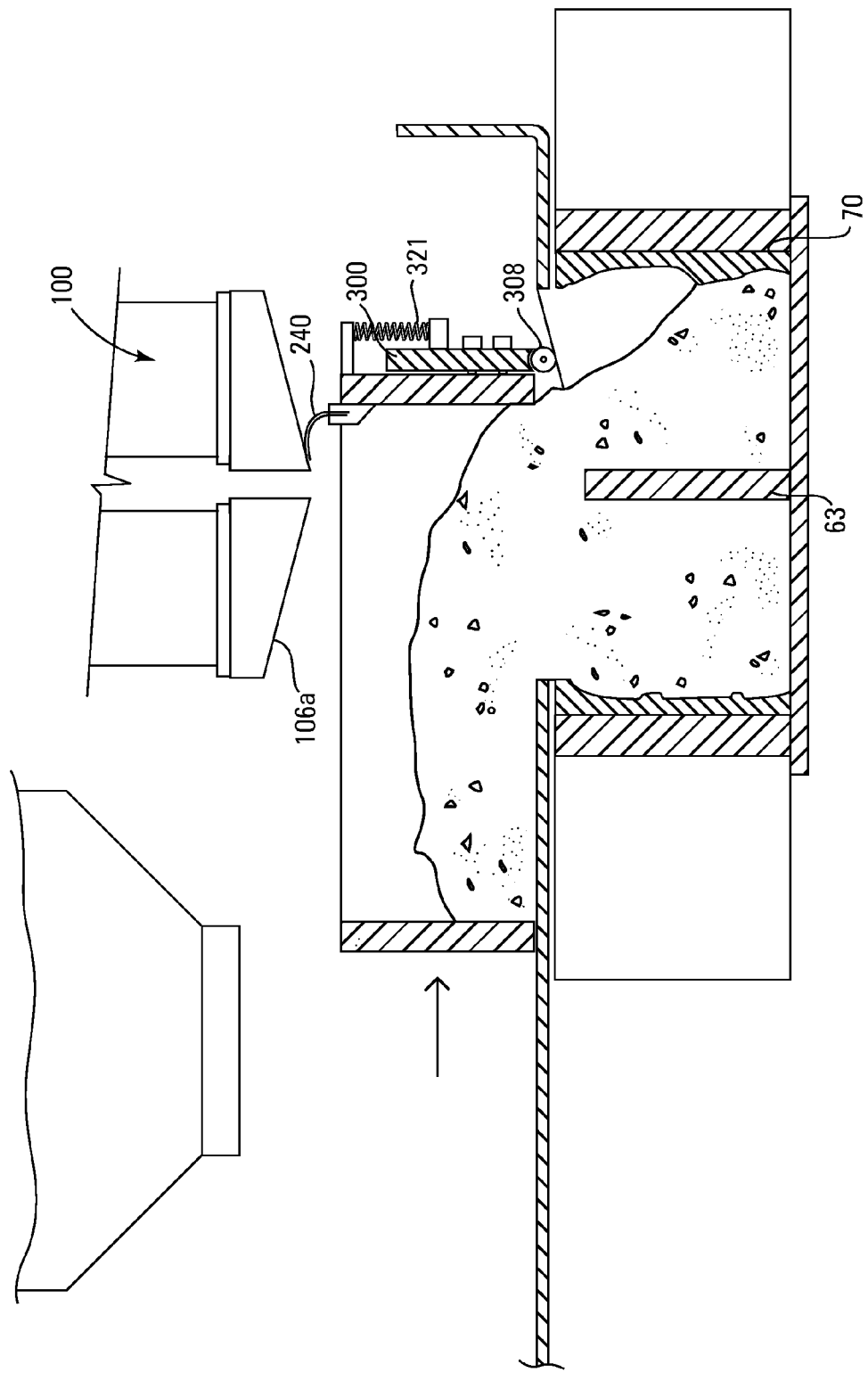

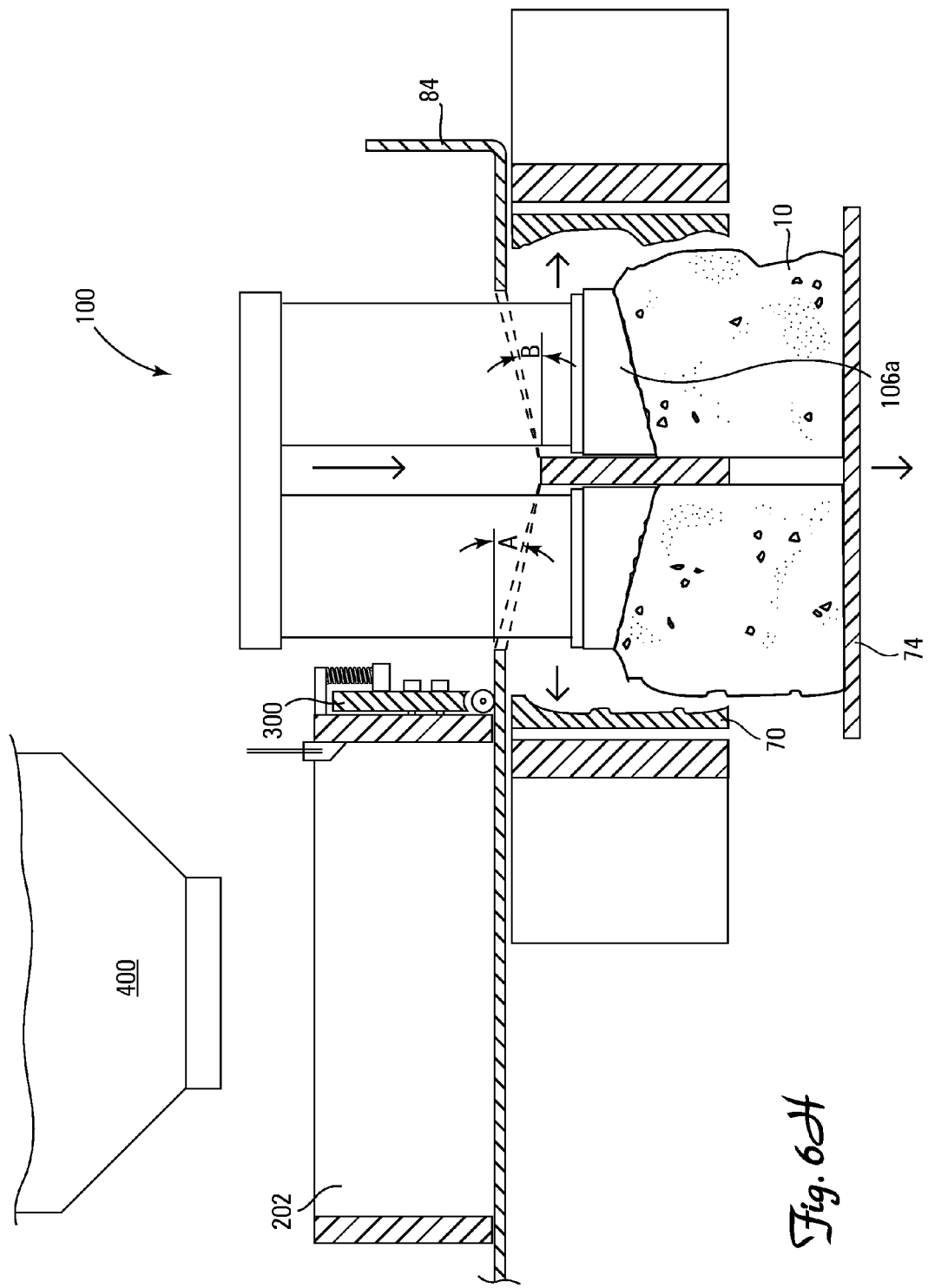

FLOATING CUT-OFF BAR AND METHOD OF USE THEREOF

This application is a continuation of U.S. Ser. No. 12/580,368, filed Oct. 16, 2009, which claims the benefit of U.S. Provisional Application No. 61/183,611, filed Jun. 3, 2009, the contents of each of which are hereby incorporated by reference herein.

FIELD OF THE INVENTION

The present invention relates generally to the production of concrete wall blocks with equal material distribution throughout the mold cavity of the block to produce structurally durable, strong and sound blocks. More particularly the invention relates to producing wall blocks with the use of a floating cut-off bar (a screed like element) that is separated yet coupled to a feed drawer for more equal distribution of concrete mix material dispersed to all parts of the mold cavity of the block being produced and can distribute an excess amount of material to areas of the mold as desired to achieve greater uniform density of material for the block thus making the blocks stronger and more durable.

BACKGROUND OF THE INVENTION

Numerous methods and materials exist for the construction of retaining walls and landscaping walls. Such methods include the use of natural stone, poured in place concrete, masonry, and landscape timbers or railroad ties. Segmental concrete retaining wall blocks which are dry stacked (i.e., built without the use of mortar) have become a widely accepted product for the construction of retaining walls. Such products have gained popularity because they are mass produced, and thus relatively inexpensive. They are structurally sound, easy and relatively inexpensive to install, and couple the durability of concrete with the attractiveness of various architectural finishes.

These wall blocks are generally produced in a mold assembly which usually consists of a mold box consisting of side frame and end frame walls forming an enclosed cavity, which rests on a production pallet or plate. The mold box assembly may contain one or multiple mold cavities which are configured to provide the block with a desired size and shape and thus may include the use of wall liners, cores and core bars, division plates, etc., as known in the art. A mixture or fill, generally of concrete material, is then poured or loaded into the mold cavities by a feed drawer that has received said material from a batching hopper. The feed drawer moves the fill over the top of the mold box assembly and dispenses the mixture into the mold cavities. As the fill is dispensed, a vibration system may be employed to shake the mold box assembly, thus providing compaction of the loose fill material to form a solid mold block. This vibration system functions to consolidate the concrete material within the mold cavities to produce a more homogeneous concrete product.

After the concrete is dispensed into the mold cavities, the feed drawer retracts rearward from over the top of the mold box assembly. Rigidly coupled on the front of the feedbox is generally a cut-off bar that strikes off and levels the mixture in the mold prior to compaction by the vibration function and stripper shoe compression head assembly producing a generally horizontal level surface. Since the cut-off bar is rigidly coupled to the feed drawer it must follow the generally horizontal path of the feed drawer. Blocks formed from the mold cavities have varying shapes and angles which may require the mix material to be distributed in different proportions from one mold cavity to another, so there is no weakening or compromising of the structural integrity and/or strength of the block from under-filling or over-filling of certain portions of the mold cavities. Since the cut-off bar follows the horizontal path of the feed drawer there is not a suitable means for distributing and leaving additional material in one portion of the mold cavity or less material in another portion of the mold cavity as may be necessary/optimal depending upon the shape and size of the block being produced. There is a need in the art for a cut-off bar that is not rigidly attached to the feed drawer and which can remove and/or redistribute varying amounts of material as necessary to all portions of the mold box cavity. This is most significant where the mold layout requires this varying distribution of material when critical elements, such as the moveable sideliners, are oriented perpendicular to the direction of travel of the feed drawer. If the mold cavities and moveable sideliners are aligned in parallel with the path of travel, then the rigid cut-off bar can be shaped to deposit the correct proportion of material over the area of need, but when the cavities are perpendicular to the feed drawer, there is currently no effective means to accomplish the correct distribution. Currently the methods used in the manufacturing process to aide in material distribution in the mold is to use an agitator grid (an element that sits over the mold box, but under the feed drawer, which functions to create general distribution of the mix material) or to isolate portions of the mold cavities from receiving a percentage of the mix material by use of blank-out plates added to the agitator grid. The blank-out plates are meant to starve some areas of the mold from receiving their full allotment of mix material, while allowing the other areas to receive the full amount. This currently is the known method of distributing material in a mold box.

Generally, after the cut-off bar and feed drawer have returned to their initial starting positions, the vibration cycle begins prior to the stripper shoe compression head, being lowered onto the consolidated material in the mold unit cavities of the mold box assembly. The stripper shoe assembly has plates or stripper shoes mounted to it having the same general plan view shape as the cavities in the mold. The plates may be set in a horizontal or angled orientation, depending on the desired shape for the top plane or surface of the block being made. The plates finalize the compression of the concrete material in the mold prior to pushing or stripping the block unit out of the mold in a downward motion. The stripper shoes are traditionally oriented parallel to the top plane of the mold (generally level or flat), but with some products they may be angled, or patterned in order to add a defined shape to the top surface of the block facing the stripper shoe plates.

The mold box assembly may be agitated to assist in compression of the mix material. Once the vibration cycle is complete, the production pallet is automatically lowered vertically away from the bottom of the mold frame during the de-molding or stripping cycle, and the newly molded block/blocks are pushed downward through the mold so that they remain on the manufacturing pallet in preparation of the next cycle of the manufacturing process were the blocks are sent to a kiln for a curing cycle. Accordingly, the desired shaped blocks can be readily removed from mold cavities.

In commonly assigned U.S. patent application Ser. No. 12/252,837, entitled "RETAINING WALL BLOCK", the entirety of which is incorporated herein by reference, a mold assembly for use in producing retaining wall blocks has a horizontal planar bottom member, a stripper shoe compression head (also referred to herein as a stripper shoe head assembly), a mold box having a plurality of side walls that define a plurality of mold cavities having open mold cavity tops and open mold cavity bottoms, the horizontal planar member enclosing the open mold cavity bottoms of the plurality of mold cavities and the stripper shoe head assembly enclosing the open mold cavity tops of the plurality of mold cavities during a block forming process. Each of the plurality of mold cavities can be shaped to form a single retaining wall block. Each of the plurality of mold cavities can be oriented such that the first side surface is formed at the bottom of the mold cavity and the second side surface is formed at the top of the mold cavity. One of the side walls of each of the plurality of mold cavities can be moveable from an inward block forming position to a retracted discharge position, the moveable sidewall having a three dimensional surface texture or pattern that imparts to the front face of the retaining wall block the three dimensional surface texture or pattern during the block forming process. The sidewalls of each of the plurality of mold cavities can include a forming channel to shape or form an extending flange or lip element which can be used as a means of connecting courses of the block in a retaining wall assembly, if the blocks are oriented with the flange in a downward position (extending downward past the bottom plane of the retaining wall block). The mold assembly further includes a core forming member which extends vertically into at least one of the plurality of mold cavities to provide the retaining wall block formed therein with a core extending from the first side surface to the second side surface, or can be partially formed from the first surface, but not all the way to the second surface. The core forming member can be configured to form a plurality of cores extending from the first side surface to the second side surface of the retaining wall block and the core or cores can have a variety of shapes, typically selected from round, oval, rectangular and square.

The stripper shoe head assembly includes a lower surface which encloses the open mold cavity tops as the stripping cycle is activated. The lower surface can be angled at an angle $\alpha$ with respect to horizontal such that the second side surface of the retaining wall block formed in each of the plurality of mold cavities during the block forming process forms angle $\alpha$ with respect to the front face of the retaining wall block, and wherein angle $\alpha$ is optimal between about 5° to 20°, or between about 7½° to 15°. Further, the sidewalls of each of the plurality of mold cavities can be shaped to form a vertically extending ridge that provides the retaining wall block with a flange receiving channel formed into a rear portion of the top surface and an upper portion of the rear face of the retaining wall block.

With current feed drawer and cut-off bar distribution techniques, the feed drawer generally distributes the same amount of material to the entirety of each mold cavity. The cut-off bar, which is rigidly coupled to the front of the feed drawer flows over the mold cavity in a horizontal path, with the feed drawer dropping and distributing the mix material as it travels. Once the feed drawer has reached its furthest forward motion point, it retracts along its original path where the cut-off bar now functions to screed or cut-off any excess material that was deposited over the open cavities of the mold, producing a generally level horizontal surface. Typically the mix material is screeded to allow an extra 0.375" to 1.0" of extra material over the block mold cavities. This material is the thickness calculated to compress during the vibration and compression cycle, such that the block will be formed in its consolidated state to a pre-determined height in the forming cavity. The stripper shoe head assembly, with angled lower surfaces, descends and encloses the open mold cavities as it finalizes the compression of the material. As the stripper shoe head assembly with angled surfaces lowers to compress the material in the mold cavities, the density of the material is more compressed where the angled surface extends the furthest into the mold cavity and the density of the material is less compressed where the stripper shoe extends into the mold cavity the least. The result is that the block is stronger and denser where the material has been compressed more and is weaker and less dense where the material has been compressed less. This produces an uneven range of density along the gradient where the material was compressed by the stripper shoe head assembly, thus the structural integrity and strength of the block may be compromised which could additionally compromise the structural integrity and strength of any structure made from the blocks. In addition, where the block is over compressed, the material may expand (rebound) when released from the mold cavity and the planer surfaces may tear as a function of this rebound effect. Oppositely, areas in the mold cavity that have not received enough material may be less compressed and have unfilled, broken and crumbling surface areas or edge conditions.

Current feed drawer and cut-off bar distribution techniques do not allow for additional material to be distributed to an area of the mold cavity that may require additional material during compression. This situation arises, for example, in applications where a three-dimensional texture is being imparted onto a surface of the block in the mold cavity. Additional material to fill all crevices and structures of the texture being imprinted may be necessary during compression to ensure that the texture is compacted properly onto the moveable liner which creates the surface of the block being produced. The additional material that is needed where the three-dimensional texture is being imprinted is not needed for the rest of the area of the mold cavity and a material distribution technique that could distribute varying amounts of material throughout a mold cavity would save on material costs while ensuring that the block produced is structurally sound, stronger and more aesthetically pleasing to the eye upon proper imprinting of the texture.

Accordingly, there is a need in the art to correct deficiencies in the distribution of material in a mold box cavity and the amounts of compression within a mold box cavity and to achieve greater overall uniform density of material of the block thus making the blocks stronger and more durable as well as any structure built from the blocks.

SUMMARY OF THE INVENTION

The invention comprises a cut-off bar that is not rigidly attached to the feed drawer and that can remove and/or redistribute varying amounts of mix material as necessary to all portions of the mold box cavity for more precise and accurate control to enhance the structural strength and integrity of the block being produced and thus the structure being built with the block.

In one embodiment the invention is a cut-off bar that follows a preselected path of travel over a mold box during a block production cycle. The selected path of travel results in the distribution of desired and varying amounts of mix material in the mold cavity. The cut-off bar may be moveably attached to a feed drawer. The mold box may be provided with a member defining the selected path of travel. The member may comprise angled or contoured division plates. The cut-off bar follows the angle or contour of the division plates to distribute the desired and varying amounts of mix material in the mold cavity. The floating cut-off bar may be biased downwardly. The downward biasing force may be supplied by one or more springs or other biasing member.

In another embodiment the invention is a block manufacturing assembly including a mold box having a member shaped to define a path of travel of a cut-off bar which moves over the mold box during a block production cycle to screed and distribute mix material in at least one mold cavity. The invention may include a feed drawer to which the cut-off bar may be moveably attached. The member which defines the path of travel of the cut-off bar may be a division plate having an angled or contoured top surface which defines the path of travel. Alternatively, the member may comprise other parts or elements of the mold box or other parts or elements which functionally cooperate with the mold box to define the path of travel of the cut-off bar.

In a further embodiment the invention comprises a feed drawer having a cut-off bar moveably connected thereto. The invention may include a mold box and wherein the cut-off bar is configured to move over the mold box at varying heights during a block production cycle to screed or redistribute mix material in at least one mold cavity at depths which vary depending on the height of the cut-off bar above the mold box.

In another embodiment the invention is a method of manufacturing a block with the floating cut-off bar described herein.

In another embodiment the invention is a method of making a block comprising removing or screeding varying amounts of mix material from the top of a mold cavity. The method includes leaving increased amounts of mix material at a first portion of the mold cavity where additional mix material is needed and leaving lesser amounts of mix material at a second portion of the mold cavity where less mix material is needed. The first and seconds portions may be positioned such that a line which intersects both portions is parallel to a path of travel of a feed drawer which fills the mold cavity with the mix material.

In a further embodiment the invention is a mold assembly for producing wall blocks comprising a production pallet, a stripper shoe, a mold box having opposed side walls and opposed end walls which together form a perimeter of the mold box, the mold box having an open top and an open bottom, the production pallet enclosing the open bottom of the mold box during a block forming process. The assembly further includes a feed drawer configured to move during the block forming process from a first position vertically offset from the mold box to a second position above the mold box and back to the first position and to discharge block forming material into the mold box during the block forming process. A material distribution element is moveably connected to the feed drawer and configured to remove excess block forming material from the mold box or redistribute block forming material in the mold box as the feed drawer moves from the second position to the first position during the block forming process. Additionally, the system includes a control member configured to control a path of travel of the material distribution element over the mold box as the feed drawer moves from the second position to the first position during the block forming process, a height of the material distribution element above the production pallet changing as the material distribution element moves along the path of travel during the block forming process. The material distribution element may comprise a cut-off bar and the control member may comprise at least one division plate dividing the mold box into a plurality of mold cavities. The at least one division plate may include a non-linear top surface which defines the path of travel of the material distribution element. The material distribution element may be connected to be moveable with respect to the feed drawer from a downward position to an upward position and may be biased to the downward position. The stripper shoe may be provided with a lower surface configured to compress block forming material in the mold box during the block forming process, the lower surface being angled from horizontal at an angle $\alpha$ which may be in the range of about 5° to 20°.

In a further embodiment the invention is a method of producing wall blocks in a mold assembly which includes a production pallet, a mold box having an open top and an open bottom, a feed drawer and a stripper shoe. The method comprises positioning the production pallet beneath the mold box to enclose the bottom of the mold box; moving the feed drawer from a first position which is vertically offset from the mold box to a second position above the mold box; depositing block forming material from the feed drawer into the mold box; moving the feed drawer from the second position back to the first position; after the block forming material has been deposited in the mold box redistributing the block forming material within the mold box such that a height of block forming material above the production pallet in a first portion of the mold box is greater than a height of block forming material above the production pallet in a second portion of the mold box, the first and second portions of the mold box being located such that a line which intersects both the first and second portions is parallel with a direction of travel of the feed drawer as it moves from the second position back to the first position; lowering the stripper shoe to enclose the open top of the mold box and to compress the block forming material within the mold box; and removing the block forming material from the mold box. The step of redistributing the block forming material in the mold box may be performed by moving a material distribution element over the mold box along a path of travel from a first end of the mold box to a second end of the mold box, a height of the material distribution element above the production pallet over the first portion of the mold box being greater than a height of the material distribution element above the production pallet over the second portion of the mold box. The material distribution element may be moveably connected to the feed drawer and wherein the redistributing step is performed when the feed drawer is moved from the second position back to the first position. The mold box may include a control member configured to control the height of the material distribution element above the production pallet as the material distribution element moves along the path of travel. The control member may comprises at least one division plate dividing the mold box into a plurality of mold cavities, the at least one division plate having a non-linear top surface which defines the path of travel of the material distribution element over the mold box.

BRIEF DESCRIPTION OF THE DRAWINGS

The invention is described with reference to the following drawings. It should be noted that for purposes of clarity and to better show features of the invention certain parts or portions of structure have been removed in various drawing figures.

FIGS. 6A to 6H are cross-sectional views of a material delivery hopper, feed drawer, floating cut-off bar, mold box, mold cavity, moveable liner plate with 3-dimensional texture, stripper shoe head assembly and manufacturing pallet demonstrating a variety of typical function positions during a mold production cycle of the present invention.

DETAILED DESCRIPTION OF PREFERRED EMBODIMENTS

The blocks produced from this invention may be made of a rugged, weather resistant material, such as concrete. Other suitable materials include plastic, fiberglass, composite materials, steel, other metals and any other materials suitable for use in molding wall blocks. The surface of the blocks may be smooth or may have a roughened appearance, such as that of natural stone. The blocks are formed in a mold and various textures can be formed on the surface, as is known in the art. It should be appreciated that the invention is equally applicable to blocks of all sizes including those whose faces are either larger or smaller than the ones referenced herein.

In accordance with an embodiment of the present invention retaining wall blocks are formed in mold box assemblies as described below. The mold box assemblies have multiple mold cavities and the blocks are formed with a first side surface resting on the production pallet and the second side surface oriented at the top of the open mold cavity. This orientation of the blocks takes up less space on the production pallet than if the blocks were oriented in a mold with their top surface on the production pallet. Thus, the number of mold cavities in the mold box can be increased so that a greater number of blocks can be made in a production cycle on a production pallet. It should be noted that the present invention is applicable to any mold box and the block or blocks formed therein may have any block shape and may have any surface shape or contour oriented to the top of the mold cavity.

Figure 1A:
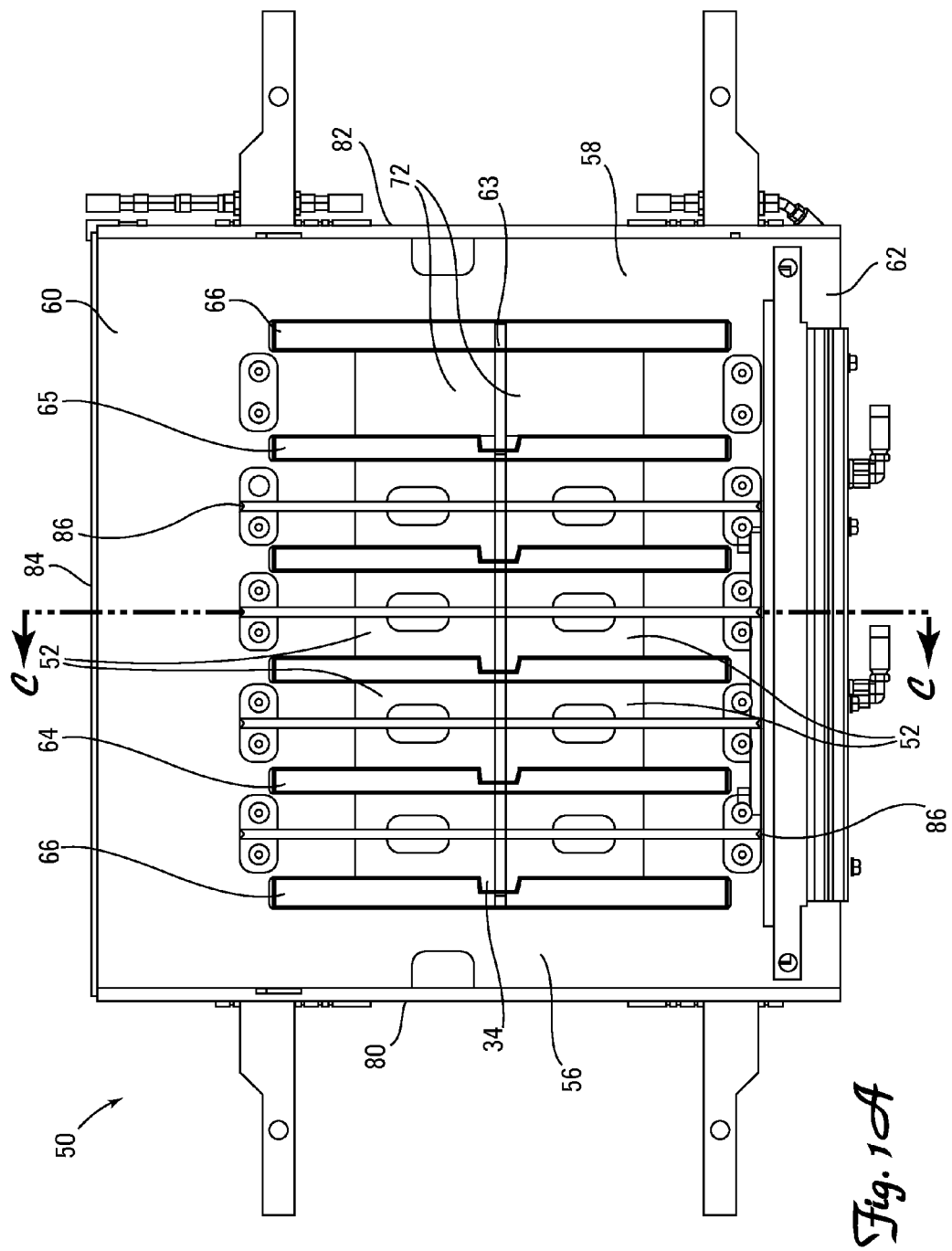
FIGS. 1A and 1B are top and perspective views, respectively, of a mold box of the present invention.
Figure 1B:
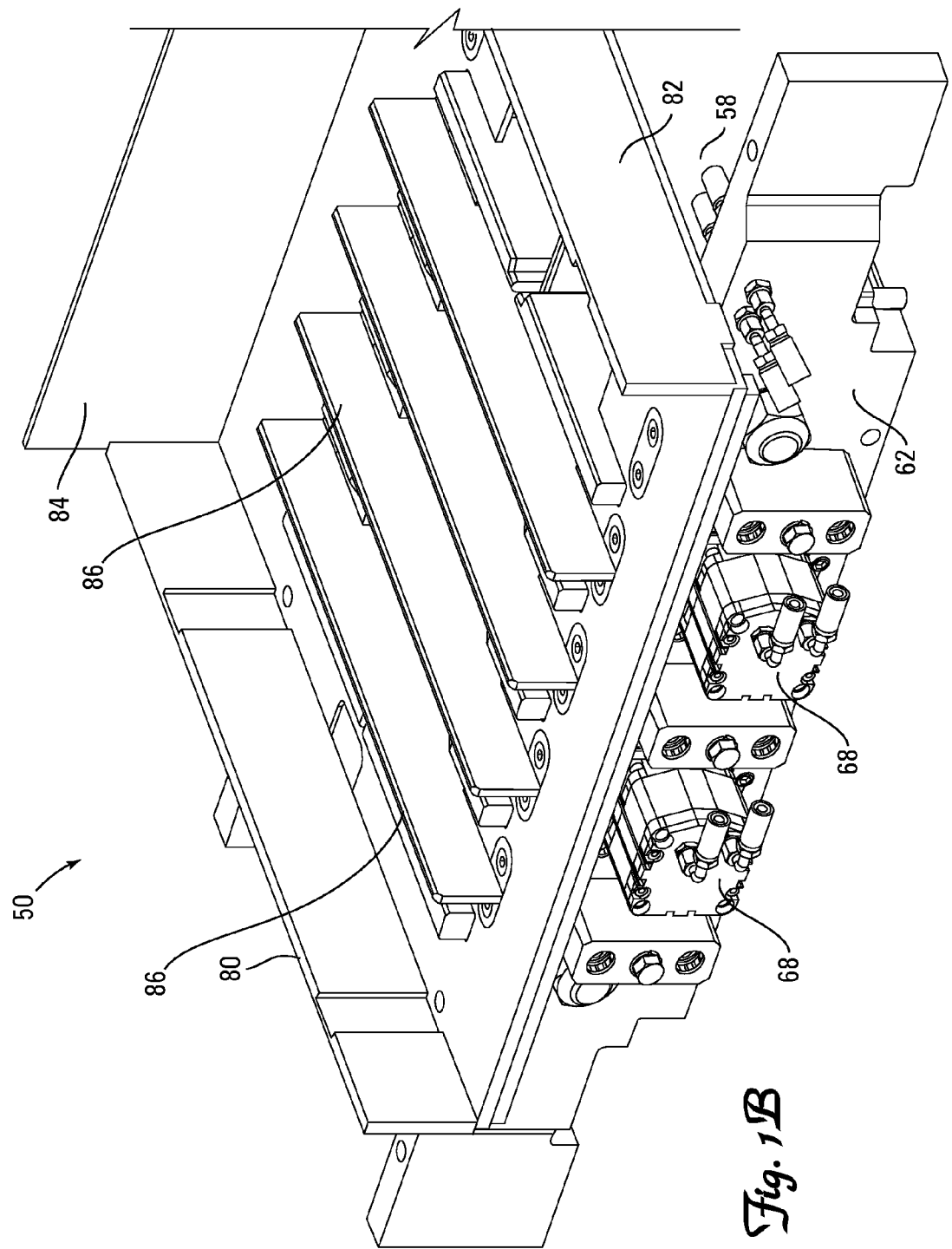
Figure 1C:
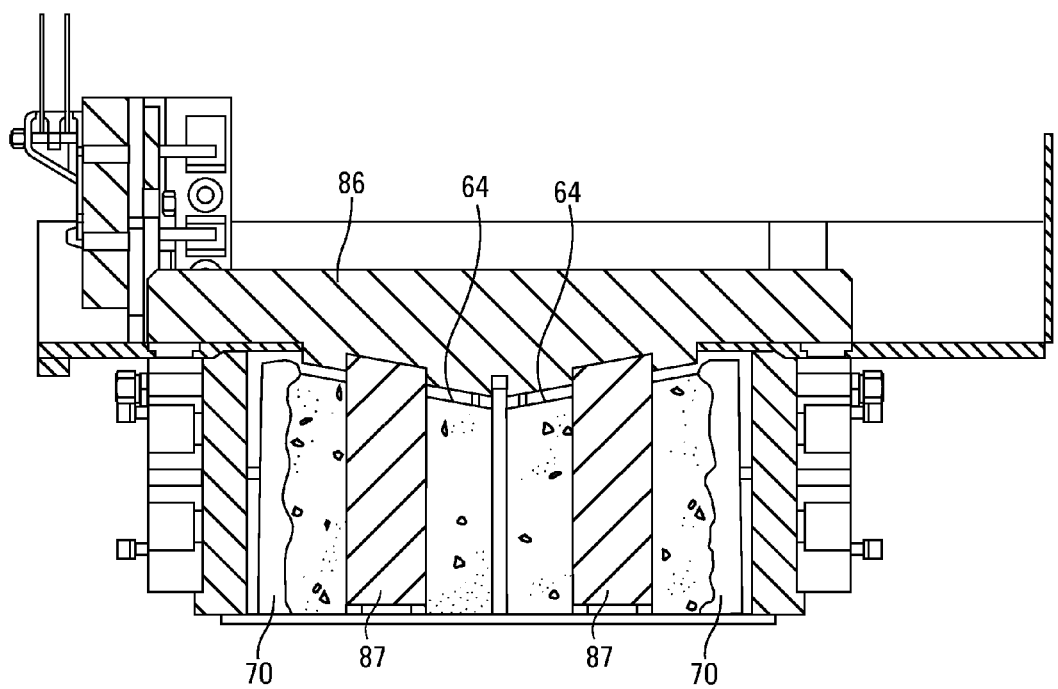
FIG. 1C is a cross sectional view of the mold box of FIGS. 1A and 1B through a mold cavity along line C-C of FIG. 1A.

FIG. 1A is a top view and FIG. 1B is a front perspective view, respectively of a mold box 50. FIG. 1C is a cross sectional view of mold box 50. Mold box 50 includes ten mold cavities consisting of eight primary retaining wall block cavities 52 and two corner block cavities 72, that are used in combination to form a retaining wall, thereby producing 10 wall blocks in a production cycle on a production pallet. Blocks of different sizes can be made in mold box 50. By way of example, the blocks formed in mold box 50 may have a height (as manufactured in the bold box) of 8 or 12 inches depending on the height of the mold cavities above the production pallet, a width (as manufactured in the mold box) of 4 inches, and a depth of 7 inches. Mold box 50 is configured and sized for use with a typical production pallet, which may have a size of 18.5 inches by 26 inches. It should be noted that the size of the production pallet is not limiting and any varying size and shape of blocks may be produced according to the application as needed. It should also be noted that the present invention is applicable to any size mold box used to form a single or multiple blocks during a production cycle.

Mold box 50 generally includes spill pan side walls 80 and 82 and spill pan end wall 84. Mold box 50 also includes opposing first and second side frame walls 56 and 58 and opposing first and second end frame walls 60 and 62.

Mold cavities 52 (eight cavities in mold box 50 as shown in FIGS. 1A) are formed by angled division plates 64 and/or side division plate 65, and/or end liners 66 that form the sides walls of the mold cavity, which along with moveable side liners 70 and center division plate 63 that form the end walls of the mold cavity, define a plurality of mold cavities having open mold cavity tops and open mold cavity bottoms. The division plates and end liners are attached to frame walls 56, 58, 60 and 62 of the mold box in a known manner. Though rigidly attached, the division plates are installed in such a way as to be replaceable when they reach a designated degree of wear. Division plates 64 and 65 are of two different shapes. Division plate 65 has substantially parallel top and bottom surfaces, while division plate 64 has an angular sloping top shape. FIG. 1C illustrates an elevation view showing the angled shape of the angled division plates 64 as they sit in the mold. The angle and contour of the division plates form a precise, predetermined and controlled material distribution pattern that a floating cut-off bar will follow as a feed drawer moves forward and backward as it travels its path over the mold box to deliver and screed off the mix material. As the feed drawer returns over the mold to its start position, any excess material that exists over the predetermined compaction height (approximate 0.375 of an inch to 1.0 inch) will be screeded off the top and the excess material will be allowed to flow back into the feed drawer. It should be noted that this shape or pattern is not limiting and any pattern could be given to the division plate or plates for the production of different sizes and shapes of blocks and material distribution patterns depending upon the application and specific block requirements.

Mold cavities 72 (two cavities in mold box 50 as shown in FIGS. 1A) are formed from division plate 65 and end liner 66 that form side walls of the mold cavity, which, along with moveable impression face liners 70 and central division plate 63 that form the end walls of the mold, define a plurality of mold cavities having open mold cavity tops and open mold cavity bottoms. Division plates 64 and 65 are of two different shapes. As previously noted division plate 65 has substantially parallel top and bottom surfaces and is used for producing mold cavity 72 which produces the corner blocks of the present invention.

Each of the mold cavities have a vertical flange forming channel 34 formed by the division plate in the cavities that produce the side walls extending from the top of the mold box to the bottom and which form a flange on each block. Blocks may be formed with cores. The cores are produced by typically hollow forms 87 used to create vertical voids or cavities in the blocks and which are attached to the core bars 86, which span the side frame walls and support the core forms in the blocks produced in the mold cavities. This is done in accordance with known techniques. Mold box 50 also includes moveable side liner mechanisms 68 which are attached to movable side liners 70. During the block production cycle the movable side liner mechanisms are positioned in a first inward or block forming position when the mold cavities are filled with moldable material. The impression face liners 70 may be created with any desired three dimensional texture or pattern and impart to the front face 12 of the retaining wall blocks any desired three dimensional texture or pattern when in this first position. When the blocks have been formed and are ready to be discharged from the mold cavities, moveable side liner mechanisms 68 are moved to a second retracted or discharge position. In the retracted position the impression face liners are spaced from the front face of the blocks far enough to allow the blocks to be discharged from the mold cavities without interference from the face liners. It should be understood that the mold box is not limiting and variations and alternate embodiments may be used as desired. It should be further understood that a plurality, but not all, of the mold cavities may have moveable side liner mechanisms or none of the mold cavities may contain the movable side liner mechanisms.

Figure 2:
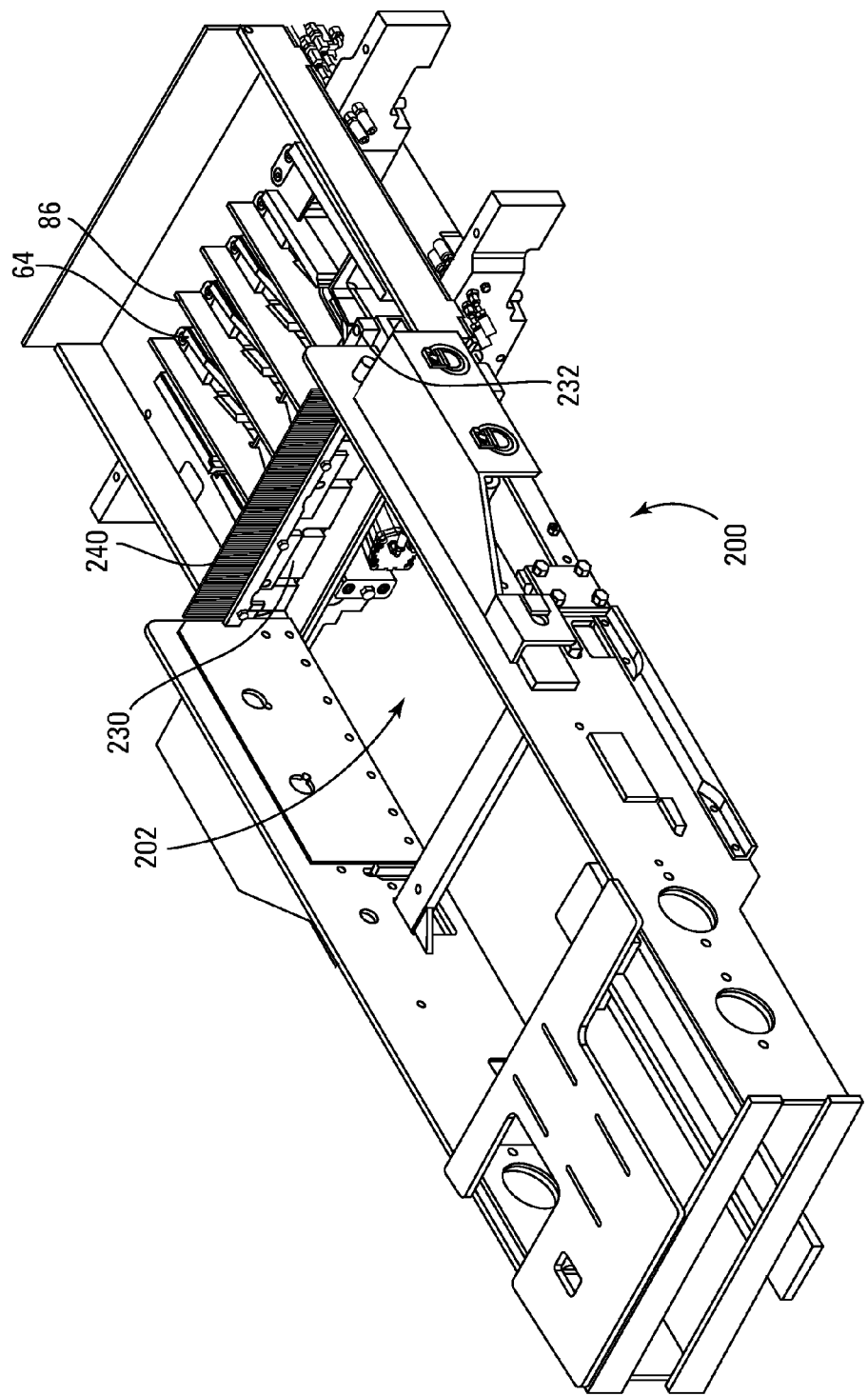
FIG. 2 is a perspective view of a feed drawer assembly and mold box of the present invention.

FIG. 2 illustrates a feed drawer assembly 200 with mold box 50 in a resting position under a mix hopper 400 (not shown in FIG. 2, see FIGS. 6A to 6H). Feed drawer assembly 200 includes a feed drawer 202 which is open at the top to receive material from the mix hopper and the bottom to dispense the material received from the mix hopper into the mold cavities as the feed drawer passes over the top of mold box 50. Feed drawer 202 has a feed drawer drive mechanism, as known in the art, which is operable for moving the feed drawer 202 from a first retracted or resting position to a second extended position with the open bottom of the feed drawer in communication with the open top of the mold box 50 and back to the retracted or resting position again.

Feed drawer 202 has end panel 230 which is rigidly connected to feed drawer 202 by fasteners 232 which may consist of bolts or the like. Brush 240 is also attached to end panel 230 and may be adjusted for height depending upon the application. Brush 240 cleans off waste material lodged or stuck to stripper shoes coupled to a head plate assembly by means of connecting plungers as known in the art. The cleaning occurs as the brush, as attached to the feed drawer passes back and forth under the stripper shoe head assembly while the material is distributed to the mold cavities of the mold box assembly.

The brush engages the bottom surfaces of the stripper shoes and dislodges and sweeps any waste material that may have been left from previous production cycles. End panel 230 also contains bolt mounting points (not shown) which can be used to mount rigid portions of the cut-off bar and bolt mounting slots 260 and 262 as seen in FIG. 3C which can be used to movably attach the floating portion of the cut-off bar to the end panel of the feed drawer assembly 202 as discussed further below.

Figure 3A:
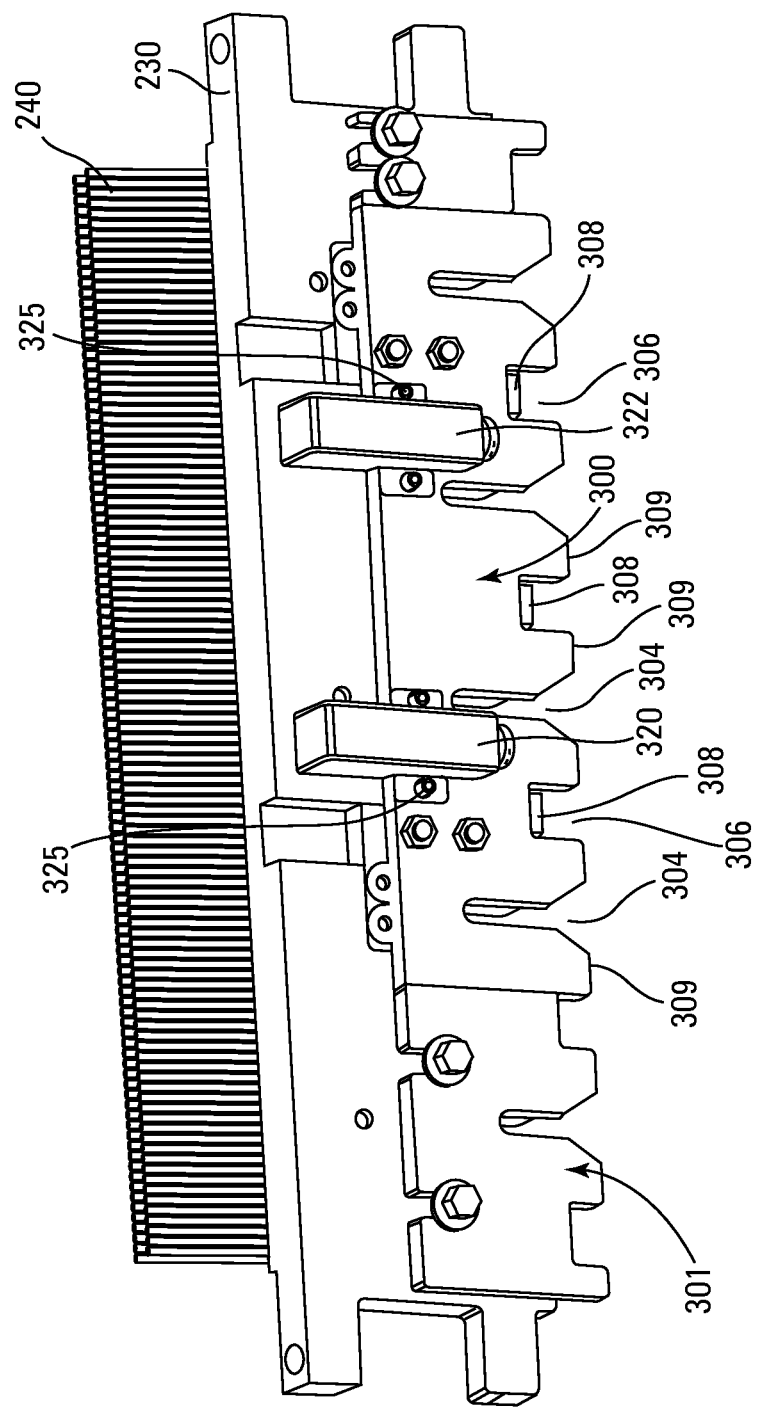
FIGS. 3A and 3B are perspective views of a floating cut-off bar of the present invention, shown in connection with the end panel of the feed drawer.
Figure 3B:
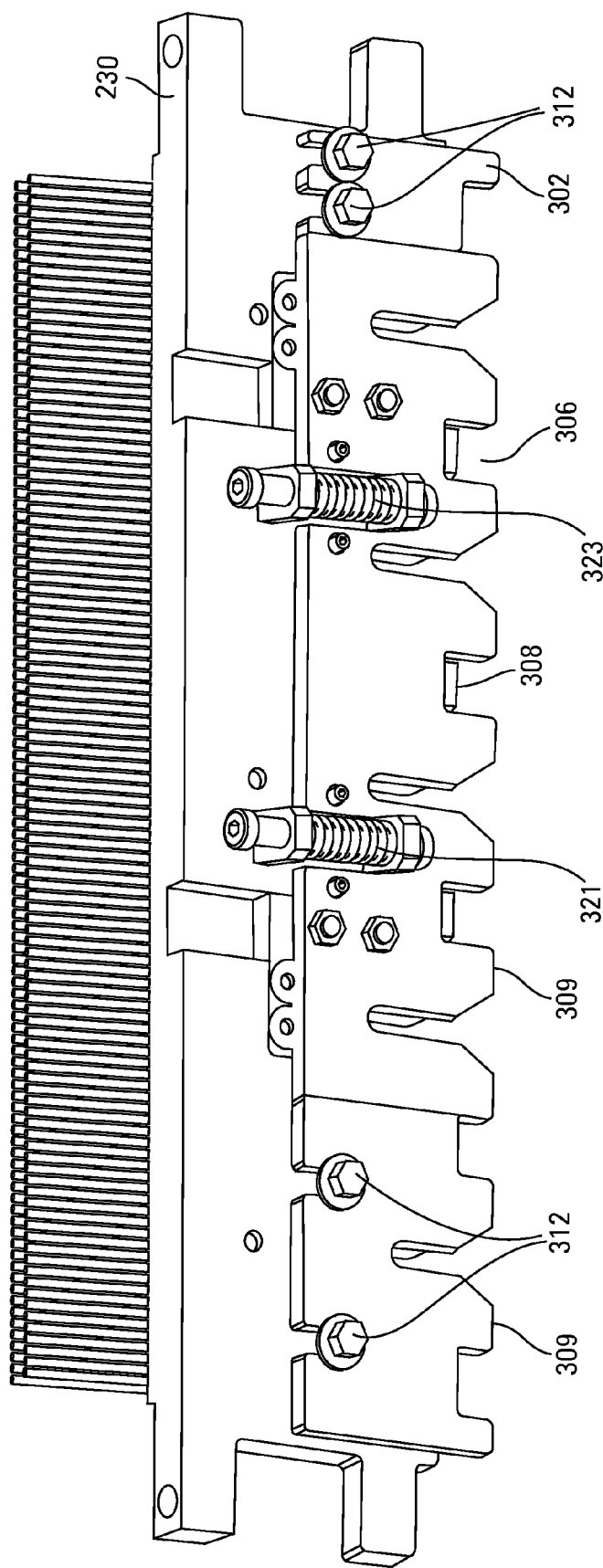
Figure 3C:
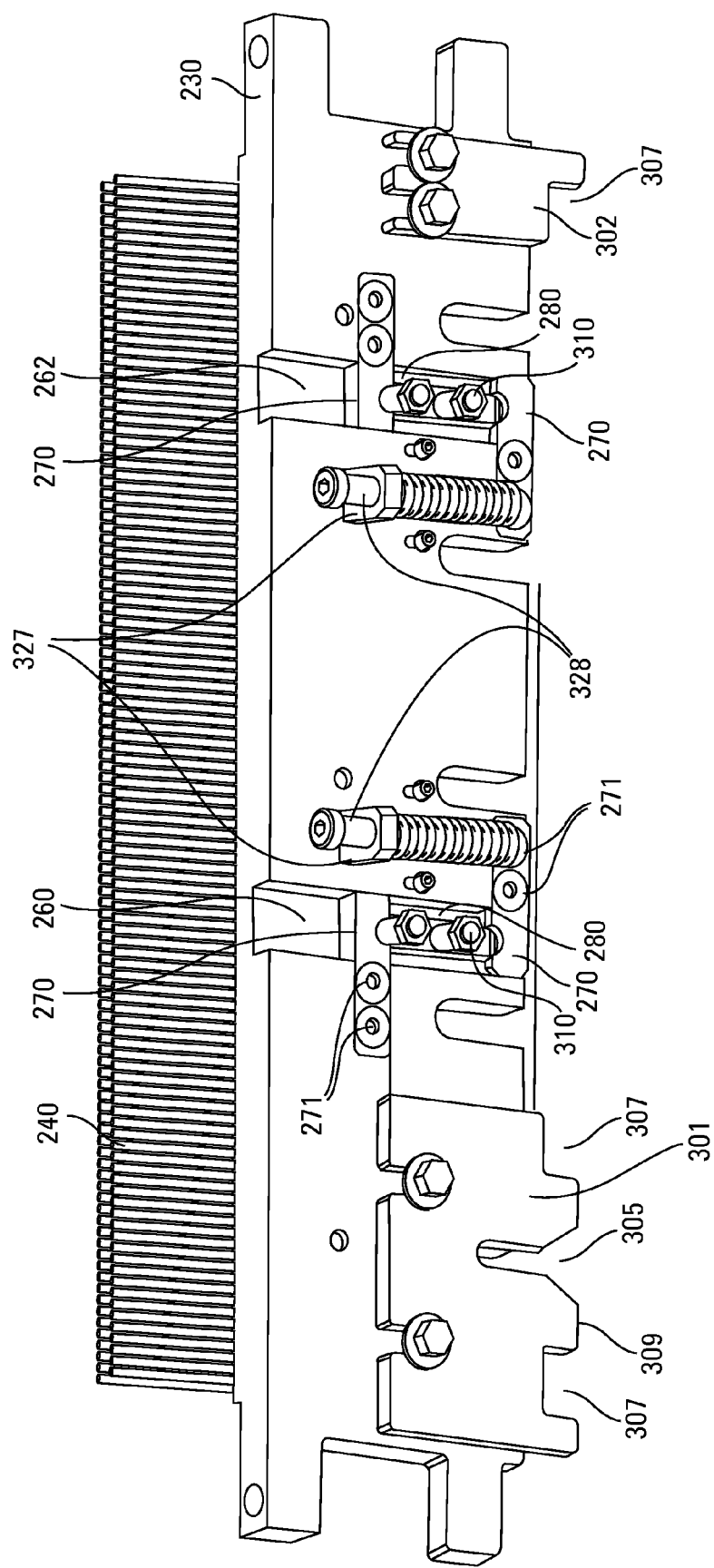
FIG. 3C is a perspective view of the end panel of the feed drawer of the present invention with the floating cut-off bar removed.

FIGS. 3A to 3C illustrate the manner in which the floating cut-off bar is moveably attached to end panel 230 of the feed drawer. FIG. 3A illustrates a front view of a floating cut-off bar 300 of the present invention. In this embodiment of the invention the cut-off bar comprises two portions, a floating cut-off bar 300 and fixed cut-off bars 301 and 302. Floating cut-off bar 300 has core bar slots 304 that allow the floating cut-off bar to fit over core bars 86 of mold box 50 with additional space to allow for the up and down movement of the floating cut-off bar as it travels the entire horizontal path of the feed drawer assembly 200 from the resting or first position to the second extended position back to the resting position, and as the floating cut-off bar vertically moves over the angular shape of the division plates 64 of mold box 50. Protective casings 320 and 322 house springs 321 and 323 which are shown without the protective covers in FIG. 3B. The protective casings 320 and 322 help to protect the springs form the stresses of the production cycle and to additionally help keep material out from between the coils of the spring as material is distributed to the mold box. Protective casings 320 and 322 are secured to the floating cut-off bar by fasteners 325. It should be noted that the number of springs is not limiting and any amount may be employed depending upon the application.

Notches 306 house roller bearing 308 which allow the floating cut-off bar to ride over the angular shaped division plates 64. As the roller bearings 308 travel along the top surfaces of the angular division plates, tabs 309 of the floating cut-off bar, adjacent to notches 306 housing the roller bearings 308, extend a predetermined distance into mold cavities 52 of mold box 50 and screed excess material back into feed drawer 202 as the feed drawer travels back to its resting position from its extended position, after completing material distribution to the mold box cavities. Roller bearings 308 are used to minimize friction in the free movement of the floating cut-off bar over the angled division plates and may also help to screed away waste material left on the top surface of the angled division plates.

Figure 4A:
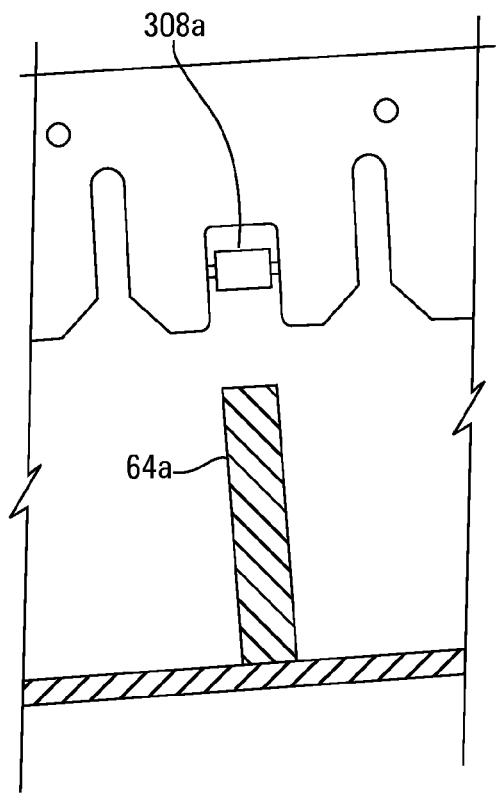
FIGS. 4A to 4C are partial front views of different embodiments of the floating cut-off bar of the present invention.
Figure 4B:
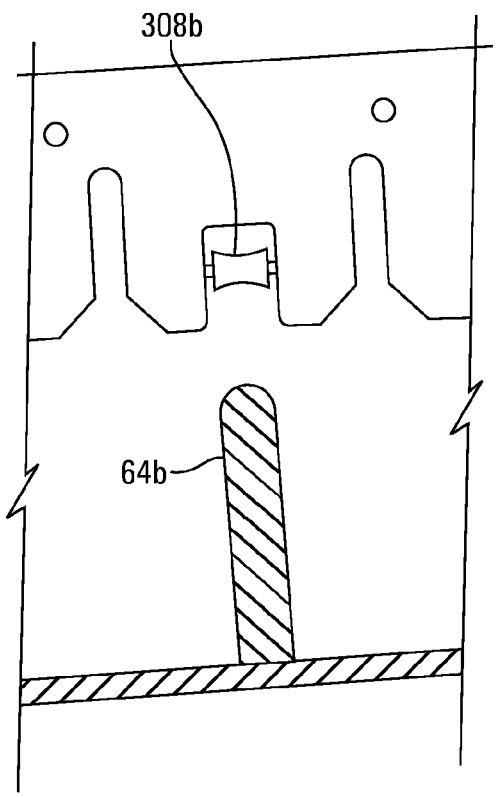
Figure 4C:
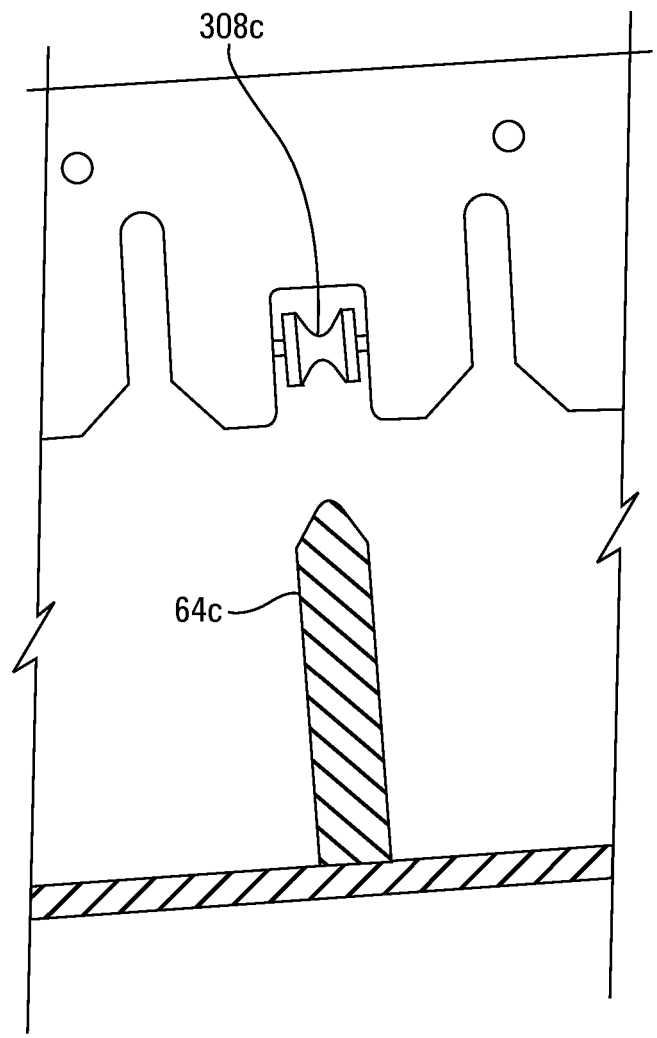

FIGS. 4A to 4C illustrate various roller bearing profiles and subsequent top surface profiles of angled division plates that may be employed with the present invention. FIG. 4A illustrates a flat profile roller bearing 308a which rides and follows the contour of a substantially flat top surface of an angled division plate 64a. FIG. 4B illustrates a round profile roller bearing 308b which rides and follows the contour of a substantially rounded top surface of an angled division plate 64b. The rounded contour of both the roller bearing and top surface of the angled division plate helps to limit the ability of fill material to sit on top of the division plate and to screed or shed away excess material left by distribution of the feed drawer. This will also help to eliminate material build-up, which helps to maintain the durability of the roller bearings. FIG. 4C illustrates a v-shaped profile roller bearing 308c which rides and follows the contour of a substantially v-shaped top surface of an angled division plate 64c. The v-shaped profile of both the roller bearing and top surface of the angled division plate further helps to shed material and prevent build-up to allow for longer lasting durability and maintainability of the floating cut-off bar and angled division plates and thus the production cycle.

Referring again to FIGS. 3A to 3C rigid cut-off bars 301 and 302 are coupled by mounting bolts 312 to mounting points of end panel 230 of feed drawer 202. Since the rigid cut-off bars 301 and 302 are fixedly coupled to the feed drawer, they follow the horizontal path of the feed drawer and no vertical movement occurs. Rigid cut-off bar 301 has notches 307 to ride over end liner 66 and division plate 65 and also has optional core bar slot 305. As the rigid cut-off bar 301 is retracted with the feed drawer after material distribution, tabs 309 help screed excess material in mold cavities 72 back into the feed drawer and notches 307 help screed additional material off the end liner and division plate. Rigid cut-off bar 302 has notch 307 which rides on end liner 66 and helps to screed excess material off the end liner as the cut-off bar is retracted after material distribution of the feed drawer.

Mounting slots 260 and 262 which can be seen in FIG. 3C. FIG. 3C shows the back surface of end panel 230 of feed drawer 202 with the floating cut-off bar 300 removed. Mounting slots 260 and 262 each contain one mounting bracket 280 and two mounting bracket stops 270. Mounting bracket stops 270 secured to end panel 230 by fasteners 271 house the sliding mounting bracket 280 in mounting slots 260 and 262 and allows for a predetermined vertical range of motion for the mounting bracket 280 in mounting slots 260 and 262. Two mounting bolts 310 attach the floating cut-off bar 300 to the mounting bracket 280 located inside each mounting slot 260 and 262 of end panel 230. Since the mounting bolts 310 coupled to floating cut-off bar 300 are attached to the mounting bracket 280 located inside the mounting slots of the end panel, the floating cut-off bar is given the vertical mobility of the mounting bracket. This coupling allows the floating cut-off bar to have vertical movement through-out the path of the feed drawer while additionally allowing the floating cut-off bar to be coupled to the feed drawer.

Springs 321 and 323 as shown in FIGS. 3B and 3C are attached to the floating cut-off bar by brackets 327 which may be welded or attached by other means to end panel 230. Tension screws 328 can be turned to adjust the coil compaction of the springs to help adjust the tension held by the springs. The tension contained in the coils of the spring as they are held in a compressed state constantly acts to push the floating cut-off bar downward. As the feed drawer drive mechanism extends the feed drawer 202 and floating cut-off bar 300 from the resting position to an expanded material distributing position springs 321 and 323 of the floating cut-off bar 300 have a release of tension while traveling along the declining slope of the angular division plate 64 and thus causes the floating cut-off bar 300 to be forcibly pressed in a downward direction. It should be noted that other suitable means other than springs may be employed such as hydraulic mechanisms and the like which create/exert movement in multiple/opposing directions and that the present invention is not limited to the use of springs to create the downward force.

Figure 6C:
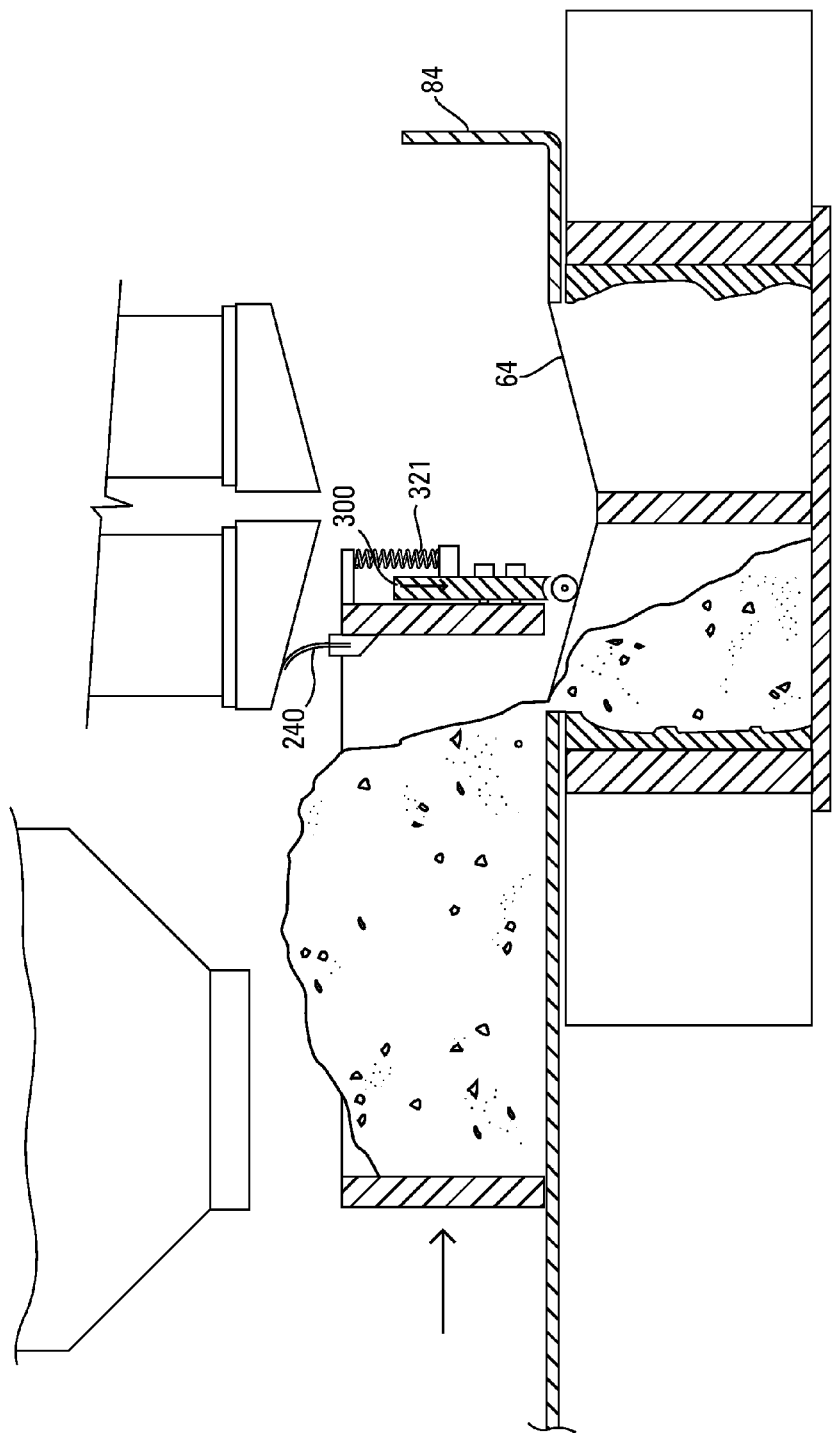
Figure 6E:
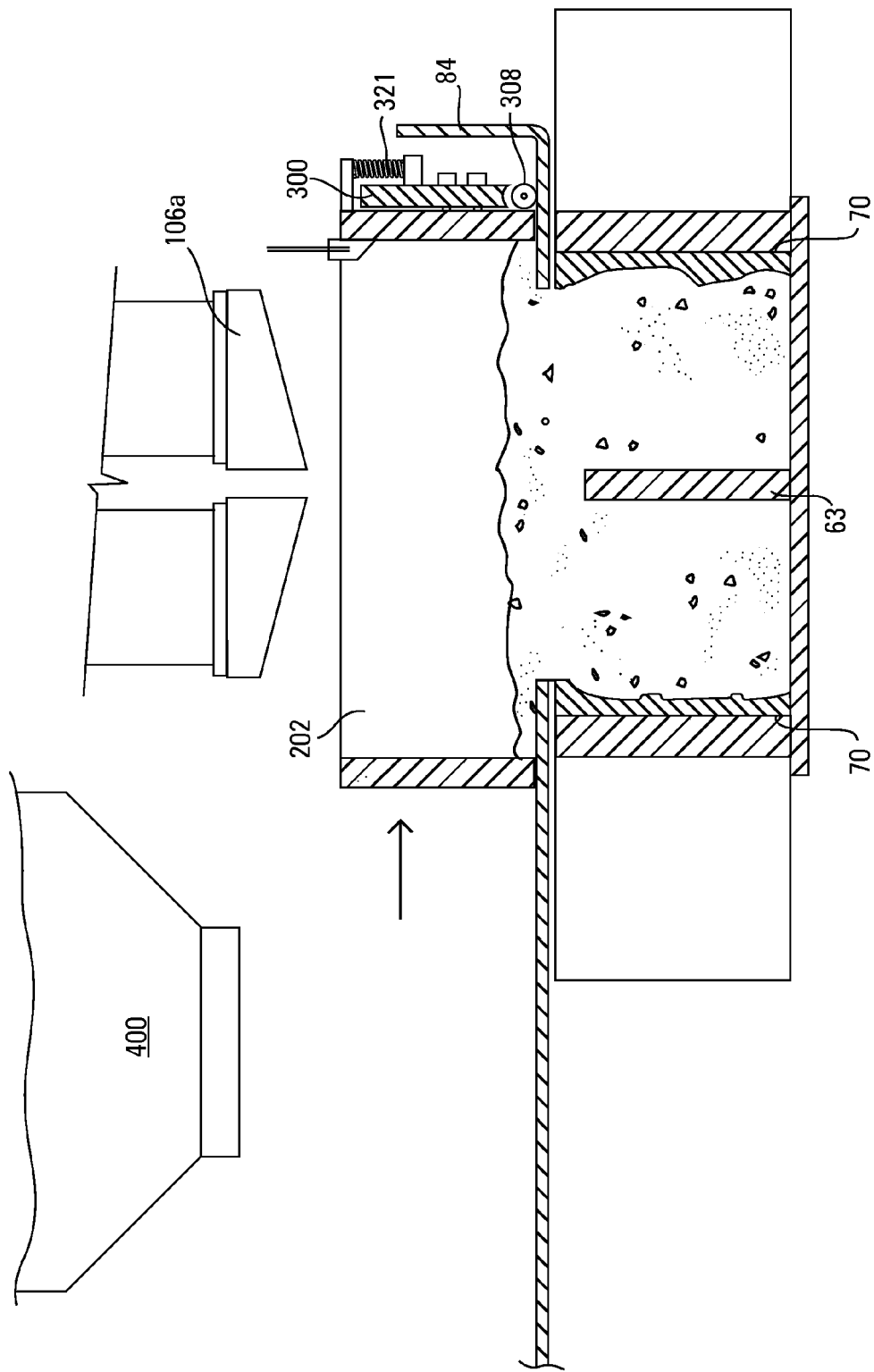
Figure 6F:
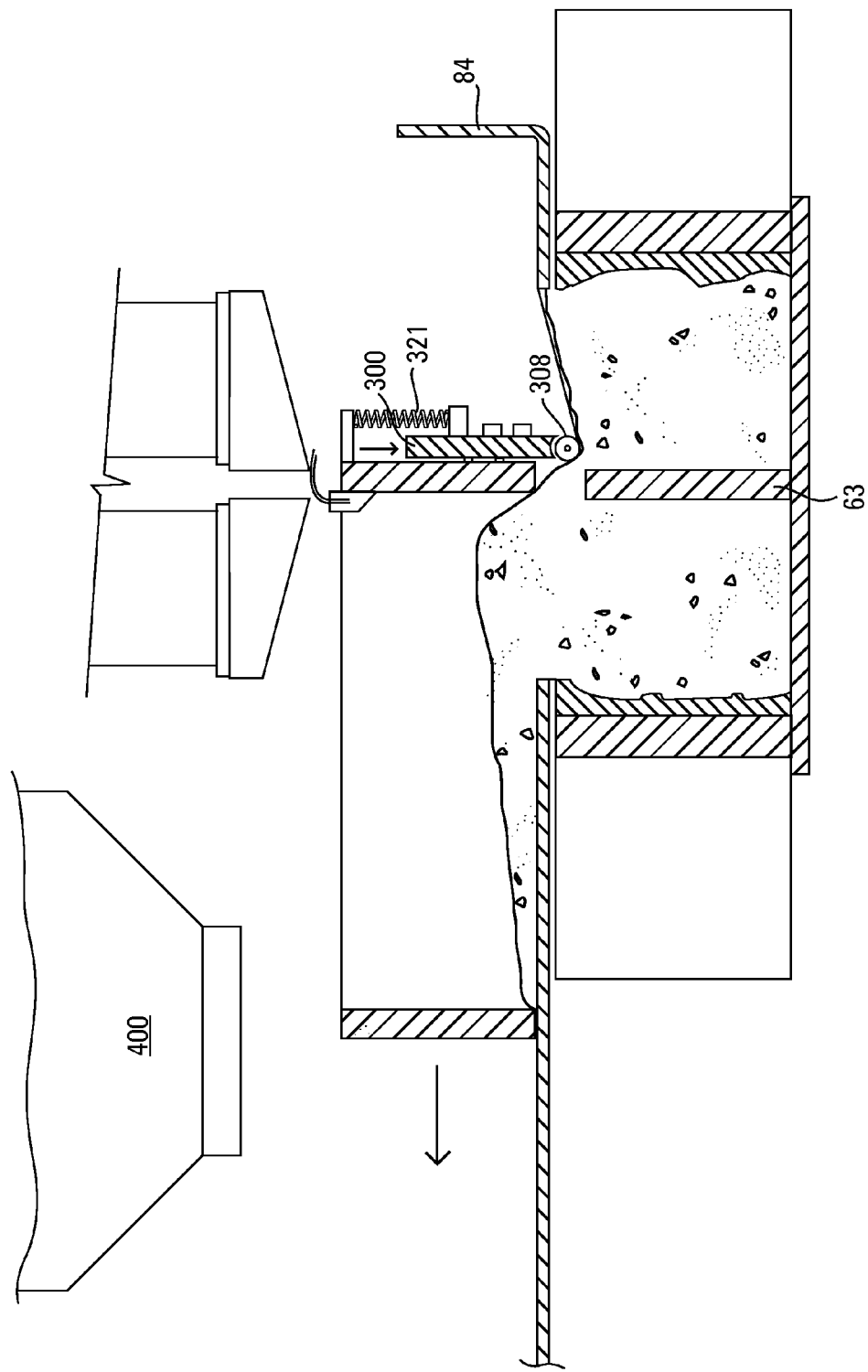
Figure 6G:
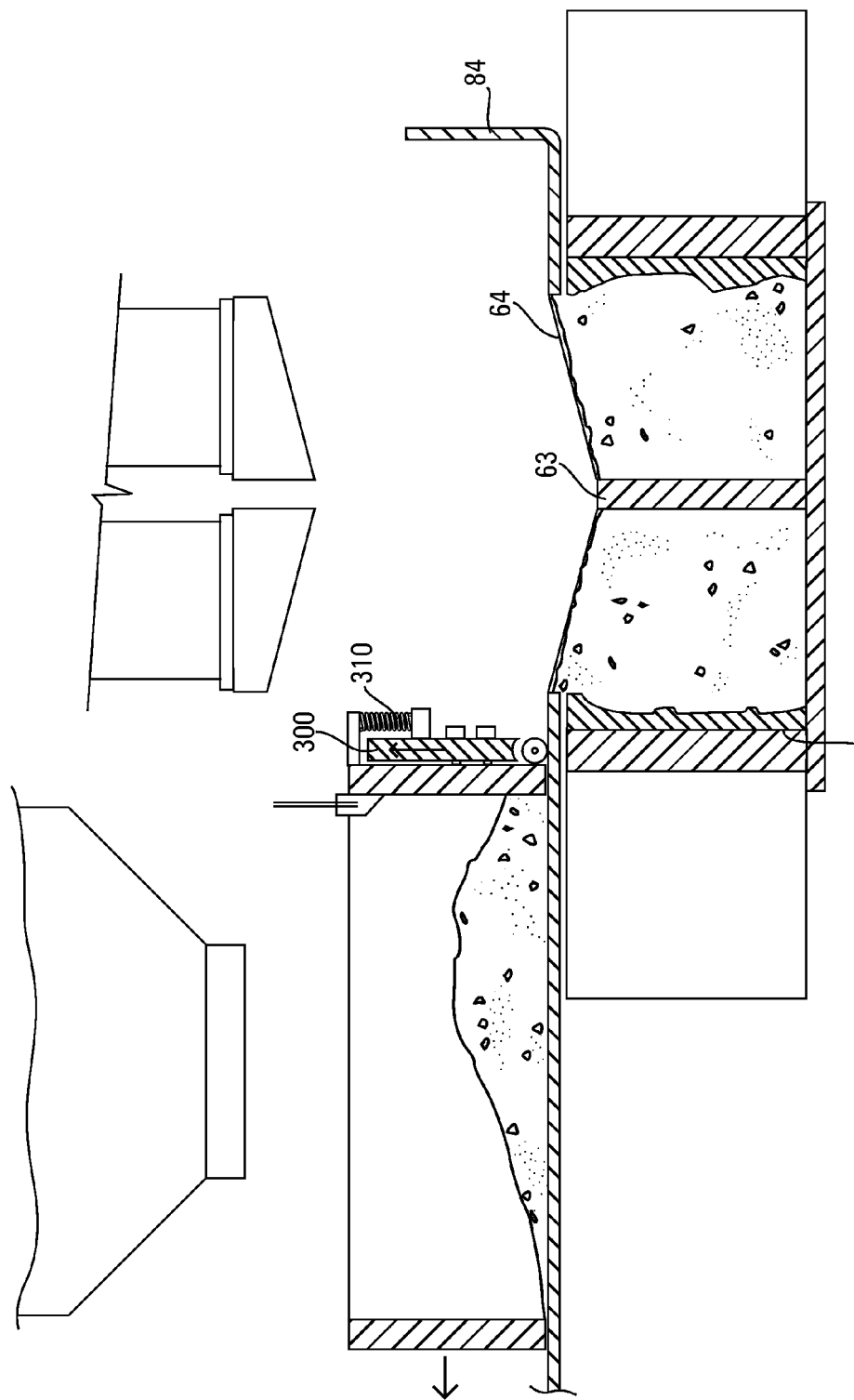

FIGS. 6A to 6H are partial cross-sectional views of the feed drawer, mold box and pallet and illustrate various functional positions of the feed drawer and cut-off bar during a typical block production cycle. FIG. 6A shows the initial position of the feed drawer and mold before material from the mix hopper 400 has been loaded into the feed drawer. In FIG. 6B the feed drawer has received the material from the mix hopper. During the production cycle roller bearings 308 engage the contoured pattern of the angled division plate 64 of mold cavities 52 and roll the floating cut-off bar along the top surface of the angled division plate 64. In FIG. 6C the floating cut-off bar 300 is pushed vertically downward by the springs 321 and 323 along the descending slope of the division plate as the feed drawer moves over the mold cavities. In FIG. 6D the floating cut-off bar 300 follows the ascending slope of the division plate 64 along the horizontal path of the feed drawer. Tension once again is established in springs 321 and 323 as the compaction of the coils occurs. In FIG. 6E the feed drawer has completed its forward movement over the mold. Once the material has been distributed by feed drawer 202 the feed drawer drive mechanism retracts the feed drawer and floating cut-off bar. In FIG. 6F the roller bearings 308 again help the floating cut-off bar to roll on and follow the contoured pattern of the division plate as the feed drawer retracts back towards its initial or starting position while the floating cut-off bar 300 is again pushed vertically downward by the springs 321 and 323 along the descending slope of the angular division plate. As the floating cut-off bar ascends the slope of the division plate 64, tension is re-established in springs 321 and 323 as the compression of the spring coils occurs. In FIG. 6G the feed drawer has been retracted back to its starting position.

During retraction of the feed drawer the floating cut-off bar 300 is also retracted back to its starting position. As the floating cut-off bar retracts it travels the horizontal and vertical path of the angular division plates and tabs 309 assist to screed any excess material delivered to the mold cavities back into the feed drawer and also assist for redistribution of material to areas that may not have received a sufficient amount of fill when the feed drawer distributed material on its way to its second fully extended position over the mold box. The contour of the angled division plate is a precise pattern for the floating cut-off bar to follow for optimal material distribution of the mold cavity for production of the wall block. This optimal material distribution allows for more precise and accurate control of the strength and integrity of the wall block being produced, and thus a structure's structural strength and integrity produced from such a block.

Rigid cut-off bar 301, because of being fixedly attached to the end panel of feed drawer 202, does not have the vertical movement of the floating cut-off bar. As the feed drawer drive mechanism extends the feed drawer and rigid cut-off bar from the resting position to an expanded material distributing position the rigid cut-off bar 301 follows the substantially horizontal path of the feed drawer over substantially horizontal end liner 66 and division plate 65 over mold cavities 72. Once the material has been distributed by feed drawer 202 the feed drawer drive mechanism retracts the feed drawer and rigid cut-off bar and tabs 309 assist to screed any excess material delivered to the mold cavities back into the feed drawer and also assist for redistribution of material to areas that may not have received a sufficient amount of fill when the feed drawer distributed material on its way to its second extended position over the mold cavities 72. The combination of floating cut-off bar and rigid cut-off bar attached to the feed drawer allows for the production of two different types/styles/shapes of blocks in a mold box production cycle. It should be noted that the combination and relative sizes of the floating cut-off bar with rigid cut-off bar is not limiting and differing sizes of each type of cut-off bar may be employed. It should be further noted that a single floating cut-off bar could be used along the entire length of the end panel of the feed drawer to encompass all mold cavities in a mold box.

Figure 5:
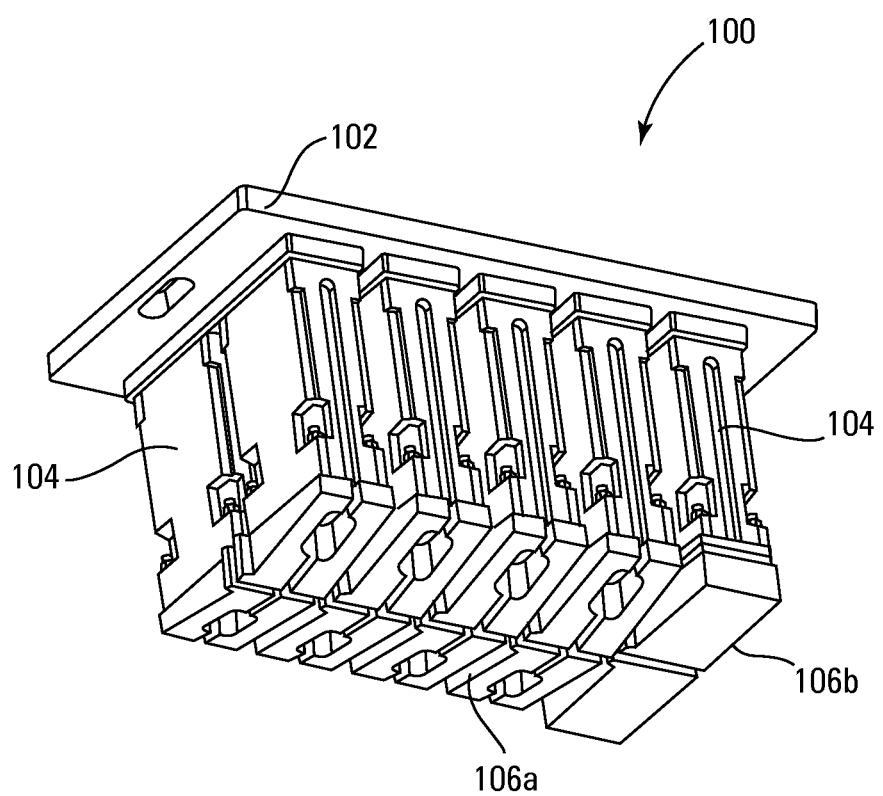
FIG. 5 is a perspective view of the stripper shoe head assembly of the present invention.

FIG. 5 is a bottom perspective view of a stripper shoe head assembly 100 in accordance with one embodiment of the present invention. Stripper shoe head assembly 100 includes a head plate 102 and stripper shoes 106a and 106b. A plurality of plungers 104 are attached between the head plate 102 and the upper portion of the stripper shoe 106a/b. Optional shoe components used for molding embossed or debossed shapes onto the top of block surface (not shown) may be received within compatible openings in the bottom of the stripper shoe 106a/b depending upon the application. The compression head has plates or stripper shoes that have the same shape as the cavities in the mold, and are used to compact the material in the mold cavities to specific densities and to aid in discharging the blocks from the mold cavities when the production cycle is complete. Typically, a lower surface of the compression head which contacts the block at the top of the open mold cavity lies in a generally horizontal plane. In accordance with the present invention the surface of the stripper shoe which contacts the second side surface of the retaining wall block at the top of the open mold cavity may be either horizontal as stripper shoe 106b to create a first type block corresponding to mold cavities 72 which may be a generally rectangular corner block; or may be angled as stripper shoe 106a to create a second type block corresponding to mold cavities 52, the angled surface imparting to the second side surface the angle α which may be in the range of 5° to 20°, or between about 7½° to 15°, but it should be noted the angle is not limiting and any angle could be achieved relative to the desired angle of the surface of the block being produced.

The surfaces of the stripper shoes 106a/b which contact the moldable material at the open top of the mold cavity forming the second side surface of the block may be textured or patterned to impart on the second side surface any desired three dimensional texture or pattern. Mold box 50 such as shown in FIGS. 1A and 1B having mold cavities which are configured to form both corner blocks and regular wall blocks with an angled side surface is useful since it requires only one mold box and one mold cycle to produce both types of blocks. It should be understood, however, that mold box 50 may be configured so that corner blocks 72 are formed in one or more mold cavities at any desired location of the mold box. Further, it is possible to configure the mold box so that all of the mold cavities are used to form corner blocks or that all of the mold cavities are used to form regular wall blocks or any desired combination thereof. The illustration of the corner blocks being formed in the two mold cavities in the upper left of FIG. 1A is merely one example of how the mold box may be configured.

As previously described, FIGS. 6A to 6H illustrate in cross section views showing the feed drawer 202 and mold box 50, and specifically illustrating mold cavity 52 with angled division plates 64, of a block production cycle of the present invention. FIG. 6A shows feed drawer 202 in a resting or retracted position sitting directly beneath the mix hopper 400 ready to be filled with material and the stripper shoe head assembly 100, located above the mold box is in its initial retracted starting position. The protective casings 320 and 322 of the springs 321 and 323 have been removed from these figures to better illustrate the mechanics of the spring and the floating cut-off bar during the production cycle.

FIG. 6B shows a pre-determined amount of material, which may be a rugged, weather resistant material, such as a low slump concrete mix, as it exits the mix or feed hopper and enters the top opening of the feed drawer assembly 200. At this time of the production cycle, movable liners 72, if they are employed, are moved into place along with the production pallet 74 to close off individual mold cavities 52 (and 72 not shown) in preparation for mold cavity fill.

FIGS. 6C to 6E illustrates the feed drawer 202 being driven forward by the feed drawer mechanism from an initial or resting position to a second fully extracted position. As the feed drawer proceeds forward the spring of the floating cut-off bar releases tension as the roller bearings follow the declining angular contour of the angled division plate, forcibly pressing the floating cut-off bar downward vertically. As the amount of space between the feed drawer and the angled division plate grows along the forward horizontal path of the feed drawer and the descending slope of division plate 64, more and more tension is released from the springs to cause the floating cut-off bar to be continuously pushed down along the angle of the division plate. As the feed drawer progresses further forward and after it has reached the center division plate 63, the floating cut-off bar begins to follow an inclining contour of the angled division liner 64 which causes tension in the springs to be recaptured as the roller bearings 308 of the floating cut-off bar ride the top surface of the angled division plate's subsequent incline. The feed drawer, as it moves forward, distributes material through its bottom opening into mold cavities 52 and brush 240 attached to the end panel of the feed drawer also cleans off waste debris located on the stripper shoes 106a (and 106b not shown) of the stripper shoe head assembly 100 as it passes underneath.

FIGS. 6F to 6G illustrates the feed drawer 202 being retracted by the feed drawer mechanism as known in the art from a second or extended position to an initial or resting position. As the feed drawer retracts back over the mold box the springs of the floating cut-off bar release tension as the roller bearings follow the declining angular contour of the angled division plate forcibly pressing the floating cut-off bar downward vertically. As the amount of space between the feed drawer and the angled division plate grows along the backward horizontal path of the feed drawer, more and more tension is released from the springs to cause the floating cut-off bar to be continuously pushed down along the declining slope of the angled division plate 64. As the feed drawer retracts further back and after it has reached center division plate 63, the floating cut-off bar begins to follow an inclining contour of the angled division plate 64 which causes tension in the springs to be recaptured as the roller bearings of the floating cut-off bar ride the top surface of the angled division plate's subsequent incline. Tabs in the floating cut-off bar screed excess material in the mold cavity through the bottom opening of the feed drawer and relocates excess material to areas of the mold cavity that may be lacking the proper specified amount.

The angle or contour of the division plate is selected to specifically deposit a greater amount of mix material in areas of the mold which typically require more material. For example, it is desirable to deposit additional material in close proximity to movable liner 70 of the mold box cavity so as to allow for excess material to be compacted into the 3-dimensional texture imprint of the movable side liners 70. Thus, the angle or contour of the division plate need not be the actual angle of the side of the block being produced. The angled division plate could be given a stepped contour or any necessary shaped contour as needed by the specific shape and size of the block being produced in the mold cavity. Two non-limiting examples of such shapes or contours are shown in greater detail in FIGS. 7A and 7B and discussed further below. Once the feed drawer has retracted fully back to its resting or initial position to where it is ready to receive more mix from the mix hopper, and the cut-off bar has fully retracted to where the initial amount of tension is achieved in springs 321 and 323 a vibration cycle is started to help consolidate and compact the concrete mix into all areas and crevasses of the mold box cavity.

FIG. 6H illustrates the end of the production cycle after the vibration cycle has stopped and the movable side liners have retracted and whereby the stripper shoe compression head assembly has been lowered into mold box 50 and engaged the material in each mold cavity and compressed it to a specified density. Since the precise amount of excess material necessary for proper compression has been uniformly achieved because of the accurate distribution of material from the floating cut-off bar's engagement of the specified contour of the division plate, proper structural integrity and strength of the block in accordance with the proper specified density requirements is achieved.

Excess filling of mix material in a mold cavity may be referred to as over cover. This over cover is exemplified by angle A which is the slope of the angled division plate and angle B which is the slope of the finished product and is the same slope as the angular stripper shoes. Angle A of the division plate is larger than that of the finished product's angle B and signifies the amount of compression that applies to the product as compaction occurs. The stripper shoes 106a of the stripper shoe head 100 then push the block 10 out of the mold box, at which point the production pallet with the final product moves downward and out from under the mold box. It then proceeds to move laterally along a conveyor line to make available the space for the next production pallet to move in under the mold box and up into position contacting the bottom of the mold for the next production cycle.

Figure 7A:
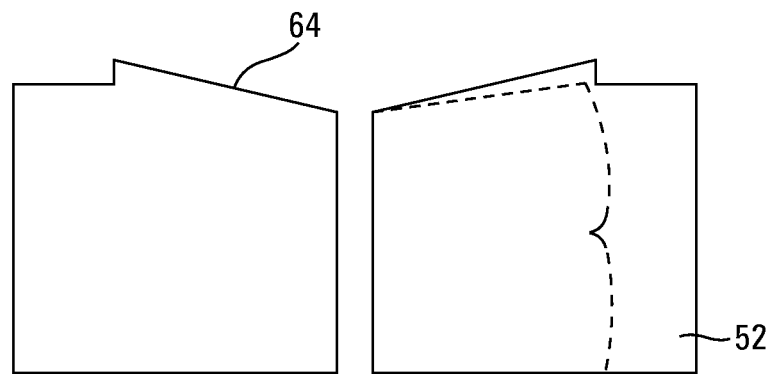
FIGS. 7A and 7B are front views of mold division liners with varying shapes used to create separate mold cavities, the shapes being selectable to offer varying amounts of mix material to be deposited on the top surface of a block being formed in the cavities.
Figure 7B:
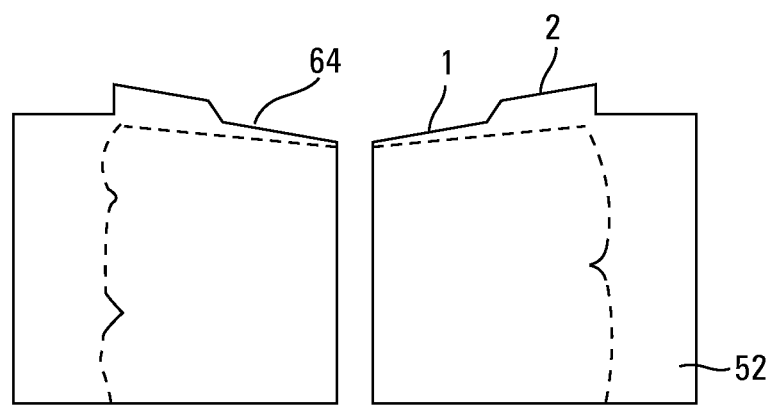

FIGS. 7A and 7B illustrate over cover which is the distribution of excess material during a production cycle into each individual mold cavity as necessary for proper block integrity. This over cover allows for compaction by vibration and stripper shoe compression to achieve greater uniform density of product necessary for proper block strength and integrity. The average over cover for a mold cavity is around 8%. FIG. 7A illustrates a single slope angled division plate 64 in mold cavity 52. The single slope provides an example of the over cover above the actual unit height that encompasses a range from 8% to 11% of additional material over the slope of the angled division liner. The 8% over cover begins at the shallowest part of the mold cavity where there are relatively few textures and structures that need additional material. The gradient of the slope increases to 11% where the greatest amount of material is needed to fill in the areas of 3-dimensional texture as imprinted in this example by the moveable side liners. The area shown in dash indicates the particular block shape of this current example. FIG. 7B illustrates a double slope over cover angled division plate in a second embodiment of mold cavity 52. The over cover of this double slope has a range of over cover for both slopes. The range of slope 1 is from 8% to 11% of over cover and the range of slope 2 is from 11% to 18% of over cover. The steeper second slope may be applicable in certain applications where even more material is needed for larger 3-dimensional texturing from the moveable liners. It should be noted that a slight incline/decline may be employed between the two slopes for greater ease and durability of the roller bearing 308 of floating cut-off bar 300 to ride along during the production cycle. As can be seen from FIGS. 7A and 7B the slope of the side of the block formed in the mold is less than the slope of the angled division plate for compression of excess material. The slope of the angled division plates used in an application can have any slope or angle as desired but an average range of about 10% to 20% of over cover may be desirable.

Although particular embodiments have been disclosed herein in detail, this has been done for purposes of illustration only, and is not intended to be limiting with respect to the scope of the following appended claims. In particular, it is contemplated by the inventor that various substitutions, alterations, and modifications may be made to the invention without departing from the spirit and scope of the invention as defined by the claims. For instance, the choices of materials or variations in shapes are believed to be a matter of routine for a person of ordinary skill in the art with knowledge of the embodiments disclosed herein. Further, although the invention has been described in connection with blocks having inconsistent heights, densities and surface deformities it should be understood that these inventive concepts and embodiments are also applicable to assist in height control, correct distribution of density and aesthetic improvement to block surface conditions caused by any reason.

What is claimed is:

1. A mold assembly for producing wall blocks comprising:
   a production pallet;
   a stripper shoe;
   a mold box having opposed side walls and opposed end walls which together form a perimeter of the mold box, the mold box having an open top and an open bottom, the production pallet enclosing the open bottom of the mold box during a block forming process;
   a feed drawer configured to move during the block forming process from a first position vertically offset from the mold box to a second position above the mold box and back to the first position and to discharge block forming material into the mold box during the block forming process;
   a material distribution element moveably connected to the feed drawer and configured to remove excess block forming material from the mold box or redistribute block forming material in the mold box as the feed drawer moves from the second position to the first position during the block forming process;
   a control member configured to control a path of travel of the material distribution element over the mold box as the feed drawer moves from the second position to the first position during the block forming process, a height of the material distribution element above the production pallet changing as the material distribution element moves along the path of travel during the block forming process; and
   a biasing member configured to continually apply a downward force on the material distribution element to bias the material distribution element against a top surface of the control member during a block forming process.

2. The mold assembly of claim 1 wherein the material distribution element is a cut-off bar.

3. The mold assembly of claim 1 wherein the control member comprises at least one division plate dividing the mold box into a plurality of mold cavities.

4. The mold assembly of claim 3 wherein the at least one division plate includes a non-linear top surface which defines the path of travel of the material distribution element.

5. The mold assembly of claim 4 wherein the material removal element includes a portion which abuts the non-linear top surface of the at least one division plate as the material distribution element moves along the path of travel.

6. The mold assembly of claim 5 wherein the portion of the material removal element comprises a roller bearing.

7. The mold assembly of claim 1 wherein the material distribution element is connected to be moveable with respect to the feed drawer from a downward position to an upward position, the material distribution element being biased to the downward position by the biasing member.

8. The mold assembly of claim 1 wherein the material distribution element is oriented parallel to the end walls of the mold box.

9. The mold assembly of claim 8 wherein the end walls include first and second end walls and wherein the path of travel of the material distribution element over the mold box is from the first end wall to the second end wall.

10. The mold assembly of claim 1 wherein the stripper shoe has a lower surface configured to compress block forming material in the mold box during the block forming process, the lower surface being angled from horizontal at an angle $\alpha$.

11. The mold assembly of claim 10 wherein angle $\alpha$ is in the range of about 5° to 20°.

12. The mold assembly of claim 1 wherein the biasing member comprises at least one spring.

* * * * *